US007617963B1

(12) United States Patent
Jensen

(10) Patent No.: US 7,617,963 B1
(45) Date of Patent: Nov. 17, 2009

(54) APPARATUS AND METHOD FOR REPAIRING WELDED ELBOW JOINTS IN A CORE SPRAY LINE

(75) Inventor: Grant Clark Jensen, Morgan Hill, CA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 0 days.

(21) Appl. No.: 12/222,425

(22) Filed: Aug. 8, 2008

(51) Int. Cl.
*B23K 37/04* (2006.01)

(52) U.S. Cl. .................................... 228/44.5; 228/49.3

(58) Field of Classification Search ....................... None
See application file for complete search history.

(56) References Cited

U.S. PATENT DOCUMENTS 3,517,701 A * 6/1970 Smith .......................... 138/97
5,735,551 A * 4/1998 Whitman et al. .............. 285/15
6,053,652 A * 4/2000 Deaver et al. ................. 403/24
6,108,391 A * 8/2000 Deaver et al. ............... 376/262
6,264,203 B1 * 7/2001 Weems et al. ............... 277/314
2005/0247754 A1 * 11/2005 Butler ....................... 228/44.5
2008/0179880 A1 * 7/2008 Vitel et al. .................. 285/184
2008/0205578 A1 * 8/2008 Abura et al. ................ 376/372
2009/0001229 A1 * 1/2009 Jensen ....................... 248/74.1
2009/0127415 A1 * 5/2009 Jensen ..................... 248/230.8

* cited by examiner

*Primary Examiner*—Kiley Stoner
(74) *Attorney, Agent, or Firm*—Nixon & Vanderhye P.C.

(57) ABSTRACT

A clamp assembly is disclosed that can be remotely installed to structurally replace the P4a and P4b welds that join a short radius elbow to the core spray horizontal pipe and the vertical downcomer pipe in the core spray line that delivers cooling water to the reactor core region in a boiling water reactor. The clamp assembly includes three subassemblies, a horizontal pipe clamp subassembly, an elbow restraint subassembly, and a downcomer pipe subassembly.

24 Claims, 29 Drawing Sheets

34 28 36 34 22 20 91 92 98 96 24 10 19 91 30 40 78 34 40 26 17 76 36 34 74 18

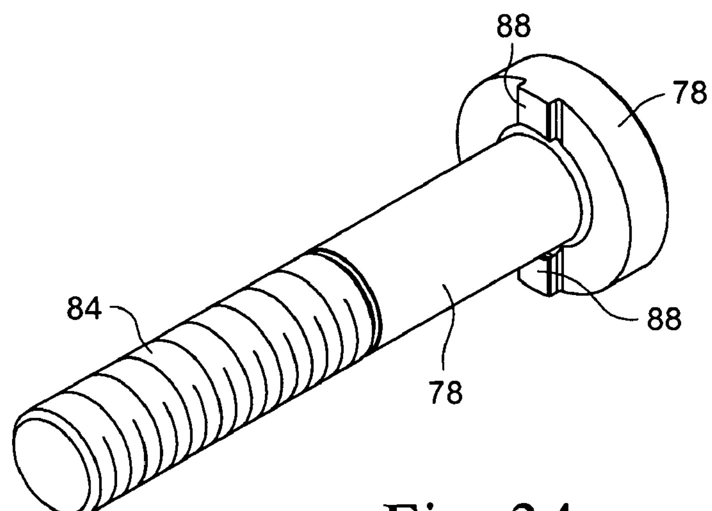
Fig. 34
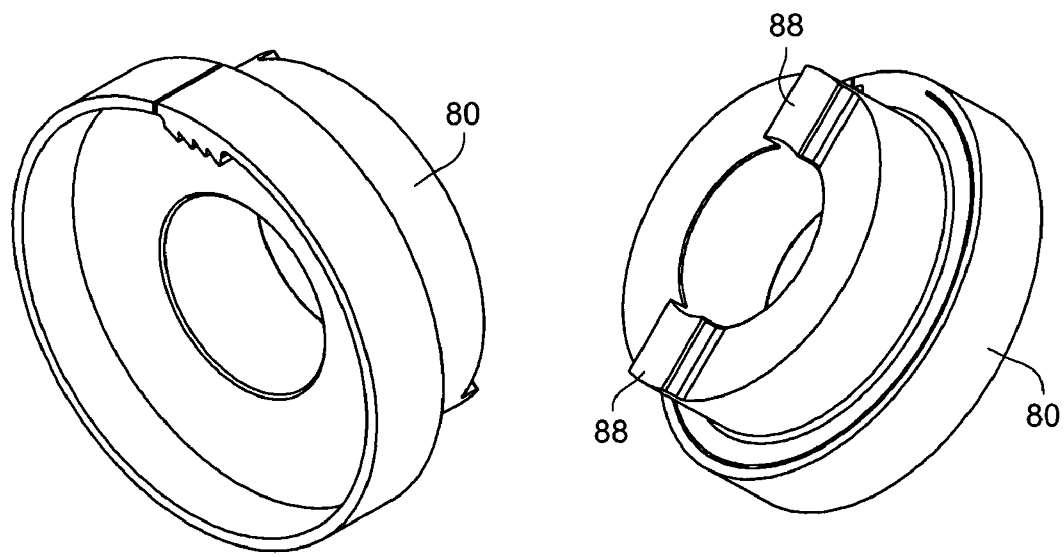
Fig. 35
Fig. 36

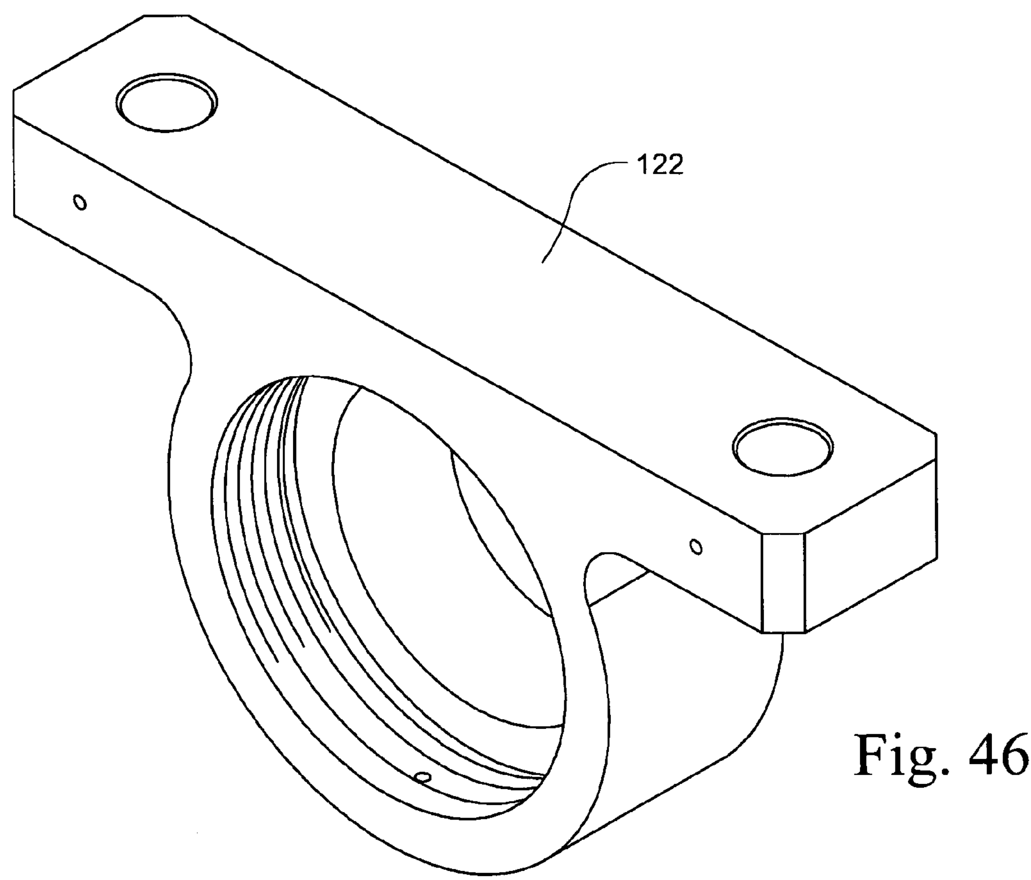
Fig. 46
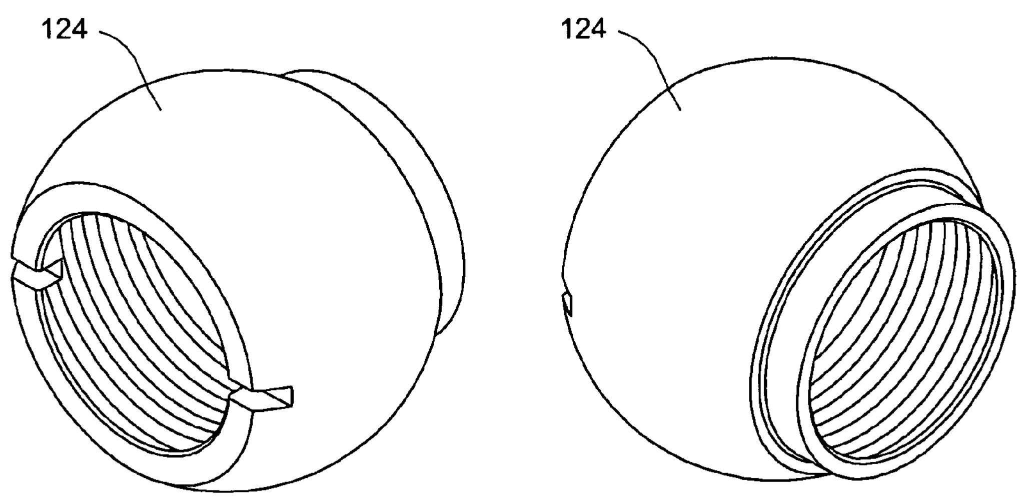
Fig. 47(a)
Fig. 47(b)

APPARATUS AND METHOD FOR REPAIRING WELDED ELBOW JOINTS IN A CORE SPRAY LINE

The present invention relates to core spray piping systems in operating boiling water reactors (BWRs), and more particularly to a repair device for repairing welded elbow joints in a core spray line.

BACKGROUND OF THE INVENTION

Common to most operating BWR's, the core spray cooling water is delivered to the reactor core region by a core spray line 10 internal to the reactor vessel. A portion of this internal piping is a horizontal segment 12, which is formed to follow the radius of curvature of the reactor vessel wall. The proximal end 14 of this horizontal core spray line 10 is connected to a T-Box 16 at the core spray nozzle penetration. The distal end 13 of this horizontal core spray line is welded to a short radius elbow 17. The weld joining the distal end 13 of the core spray line 10 to the short radius elbow 17 is designated as the P4a weld. A vertical downcomer pipe 18 is welded to the opposing end of the short radius elbow 17. The weld joining the downcomer pipe 18 to the short radius elbow 17 is designated as the P4b weld. This piping configuration and associated connecting welds are shown in FIGS. 1 and 2.

The core spray piping systems in operating BWR's are of welded construction. The welds in the original core spray line 10 are susceptible to Intergranular Stress Corrosion Cracking (IGSCC). In the event that cracking should occur in the P4a weld or the P4b weld, the structural integrity of the core spray line 10, which delivers cooling water to the reactor core would be lost. A preemptive repair would be to design, fabricate, and install a clamping device, which would prevent separation of one or both of the P4a and P4b welds in the event that circumferential through-wall cracking should occur at these weld locations in the core spray line 10.

BRIEF DESCRIPTION OF THE INVENTION

In an exemplary embodiment of the invention, an apparatus for repairing welded joints connecting an elbow between first and second pipes comprises a first clamp subassembly for attachment around the first pipe, a second clamp subassembly for attachment to the second pipe, and an elbow restraint subassembly for attachment to the elbow, the first clamp subassembly having a first strut inserted through a part of the first clamp subassembly, the second clamp subassembly having a second strut inserted through a part of the second clamp subassembly, the elbow restraint subassembly including a plurality of components for attaching the first strut and the second strut to one another and to the elbow restraint subassembly so that the elbow restraint subassembly and the first and second clamp subassemblies are fixedly positioned with respect to one another, and thereby the first and second pipes prevented from separating from the elbow.

In another exemplary embodiment of the invention, an apparatus for repairing welded joints connecting an elbow between a reactor vessel core spray line pipe and a downcomer pipe comprises a spray line pipe clamp subassembly for attachment to the spray line pipe, the spray line pipe clamp subassembly having a first strut inserted through a part of the spray line pipe clamp subassembly, a downcomer pipe clamp subassembly for attachment to the downcomer pipe, the downcomer pipe clamp subassembly having a second strut inserted through a part of the downcomer clamp subassembly, and an elbow restraint subassembly for attachment to the elbow, the elbow restraint subassembly including a plurality of components for attaching the first strut and the second strut to one another and to the elbow restraint subassembly, the plurality of components including a swivel mount subassembly for adjusting the orientation of the plurality of attaching components to facilitate connecting the first and second struts to one another and to the elbow restraint subassembly so that the elbow restraint subassembly, the spray line pipe clamp subassembly and the downcomer pipe clamp subassembly are fixedly positioned with respect to one another, and thereby the spray line pipe and the downcomer pipe prevented from separating from the elbow.

In a further exemplary embodiment of the invention, an apparatus for repairing welded joints connecting an elbow between first and second pipes comprises a first and second clamp subassemblies for attachment to the first and second pipe, respectively, the first and second clamp subassemblies each being comprised of a first and second clamp bodies, at least one clamp bolt extending through the first and second clamp bodies, at least one clamp bolt keeper nut threaded onto the at least one clamp bolt to join together the first and second clamp bodies on opposite sides of the first or second pipe in facing relation, at least one stop bolt inserted into the first clamp body and seated in a hole machined in the first or second pipe, and at least one stop bolt keeper located on the first clamp body and engaging the at least one stop bolt to prevent rotation of the at least one stop bolt and thereby retain a preload on the at least one stop bolt, and an elbow restraint subassembly for attachment to the elbow, the elbow restraint subassembly comprising an inboard elbow restraint body including a protrusion curved to engage an inside radius of the elbow, an outboard elbow restraint body including a plurality of fingers shaped to engage an outside radius of the elbow, at least one restraint bolt extending through the outboard elbow restraint body and being threaded into the inboard elbow restraint body to draw together the outboard and inboard elbow restraint bodies and thereby secure the plurality of fingers and the curved protrusion on opposite sides of the elbow in facing relation to one another, and at least one restraint bolt keeper located on the outboard elbow restraint and engaging the at least one restraint bolt to prevent rotation of the at least one restraint bolt, the first and second clamp subassemblies having first and second struts inserted through parts of first and second clamp subassemblies, respectively, the elbow restraint subassembly further comprising a swivel mount subassembly and a connector bolt inserted through the first and second struts and attached to the swivel mount subassembly for attaching the first strut and the second strut to one another and to the elbow restraint subassembly so that the elbow restraint subassembly and the first and second clamp subassemblies are fixedly positioned with respect to one another, and thereby the first and second pipes prevented from separating from the elbow.

BRIEF DESCRIPTION OF THE DRAWINGS

FIG. 34 is an isometric view of a connector bolt.

FIG. 35 is an isometric view of a connector bolt nut keeper.

FIG. 36 is another isometric view of the connector bolt nut keeper of FIG. 35.

FIG. 46 is an isometric view of a swivel mount.

FIGS. 47(*a*) and (*b*) are isometric views of a ball swivel.

DETAILED DESCRIPTION OF THE INVENTION

The present invention is directed to a clamp assembly 20 that can be remotely installed to structurally replace the P4a and P4b welds, which join the short radius elbow to the core spray horizontal pipe and the vertical downcomer pipe in the core spray line. This clamp assembly is applicable to Boiling Water Reactor plants with varying sized core spray lines. One embodiment of the clamp assembly 20, which structurally replaces the P4a and P4b welds is shown installed on the core spray line and the downcomer pipe in FIGS. 3-5. The clamp subassemblies that comprise the design of the elbow clamp assembly 20 are also shown in isometric representation in FIGS. 3-5. These subassemblies include a horizontal pipe clamp subassembly 22, an elbow restraint subassembly 24 and a downcomer pipe subassembly 26.

Figure 6:
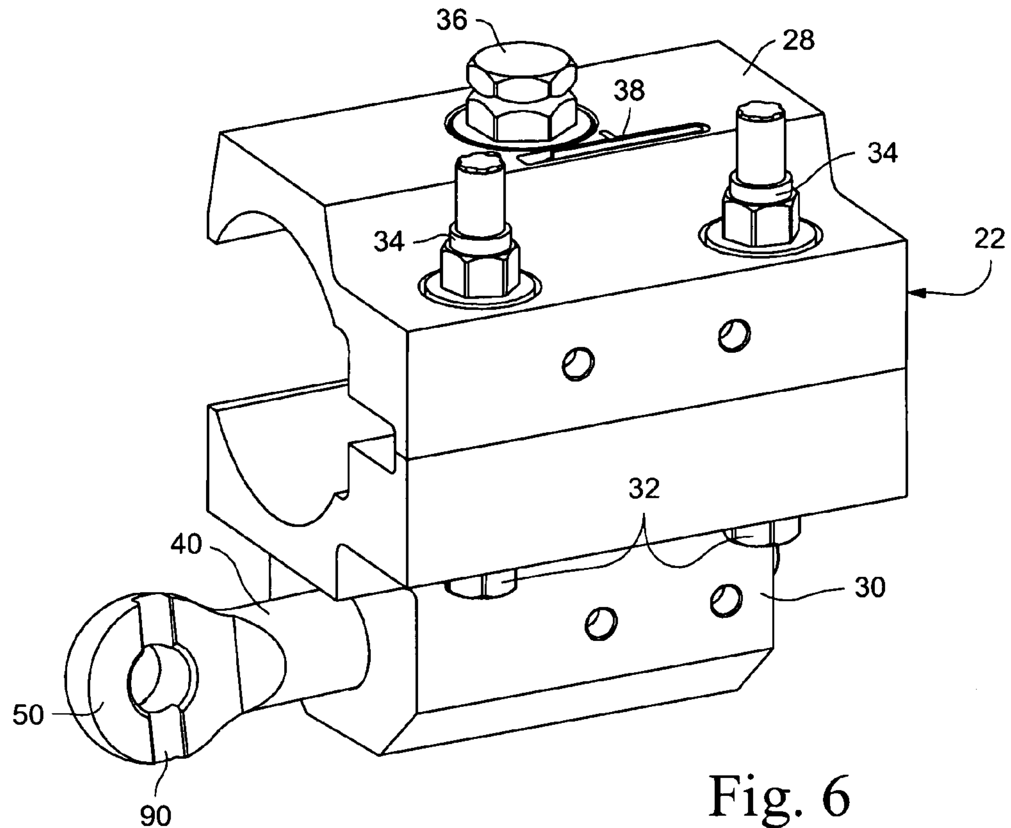
FIG. 6 is a top isometric view of a horizontal pipe clamp subassembly.
Figure 7:
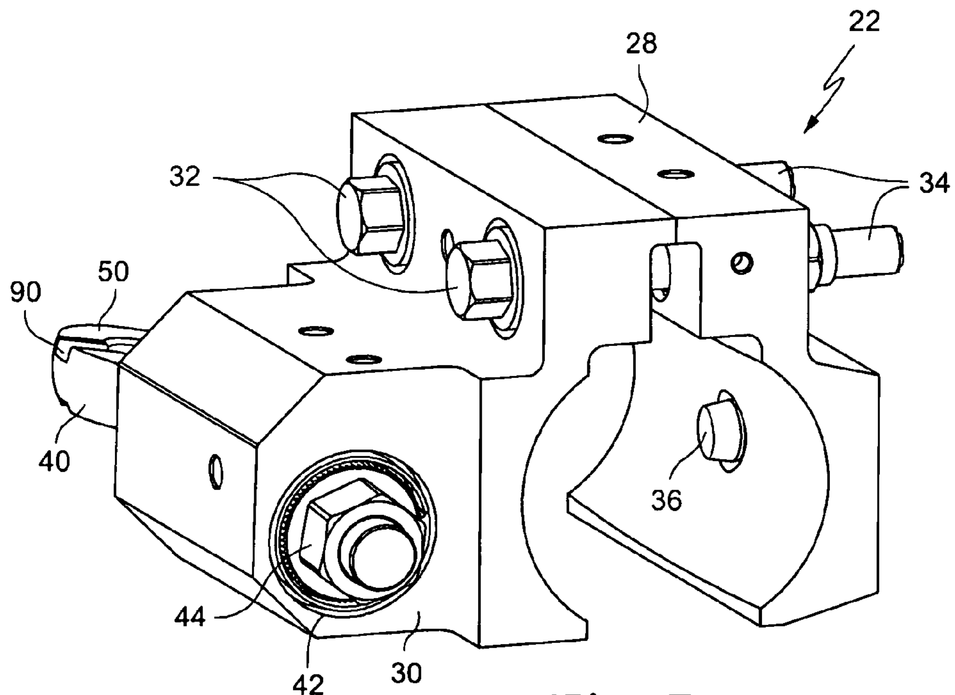
FIG. 7 is a bottom isometric view of a horizontal pipe clamp subassembly.
Figure 9:
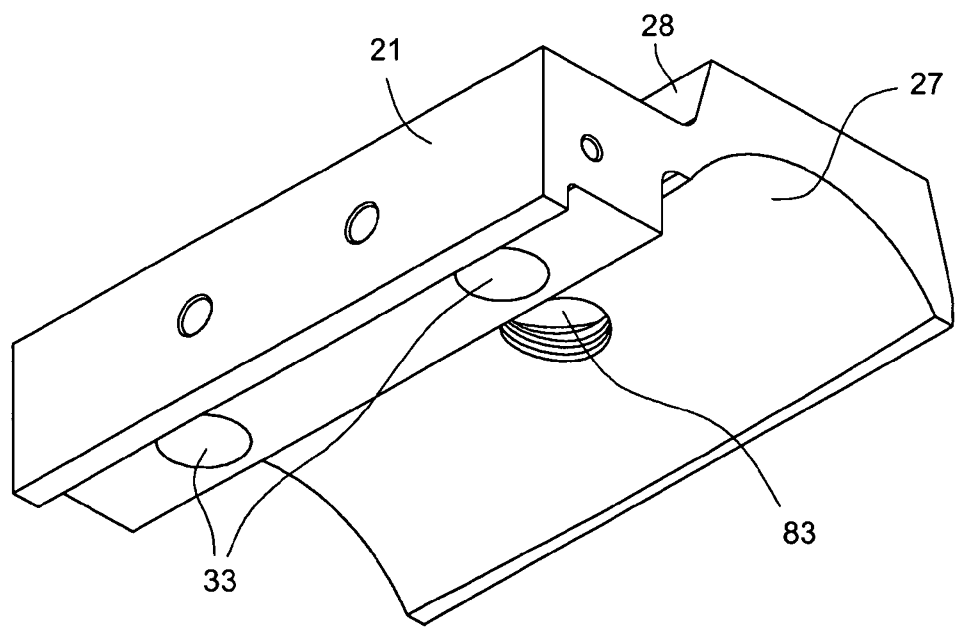
FIG. 9 is a bottom isometric view of an upper clamp body.
Figure 10:
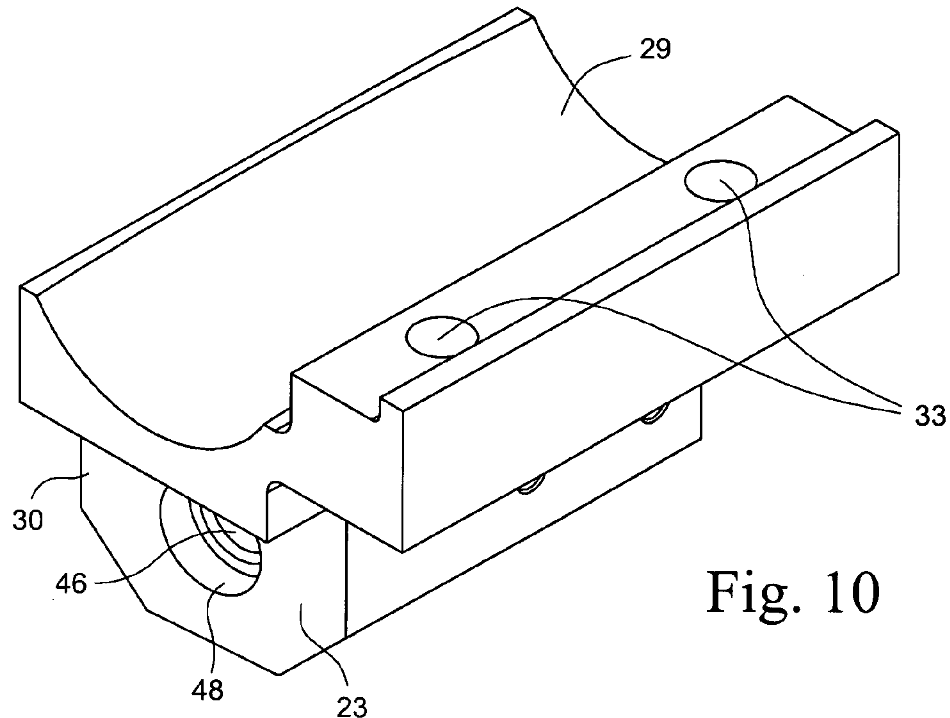
FIG. 10 is a top isometric view of a lower clamp body.
Figure 11:
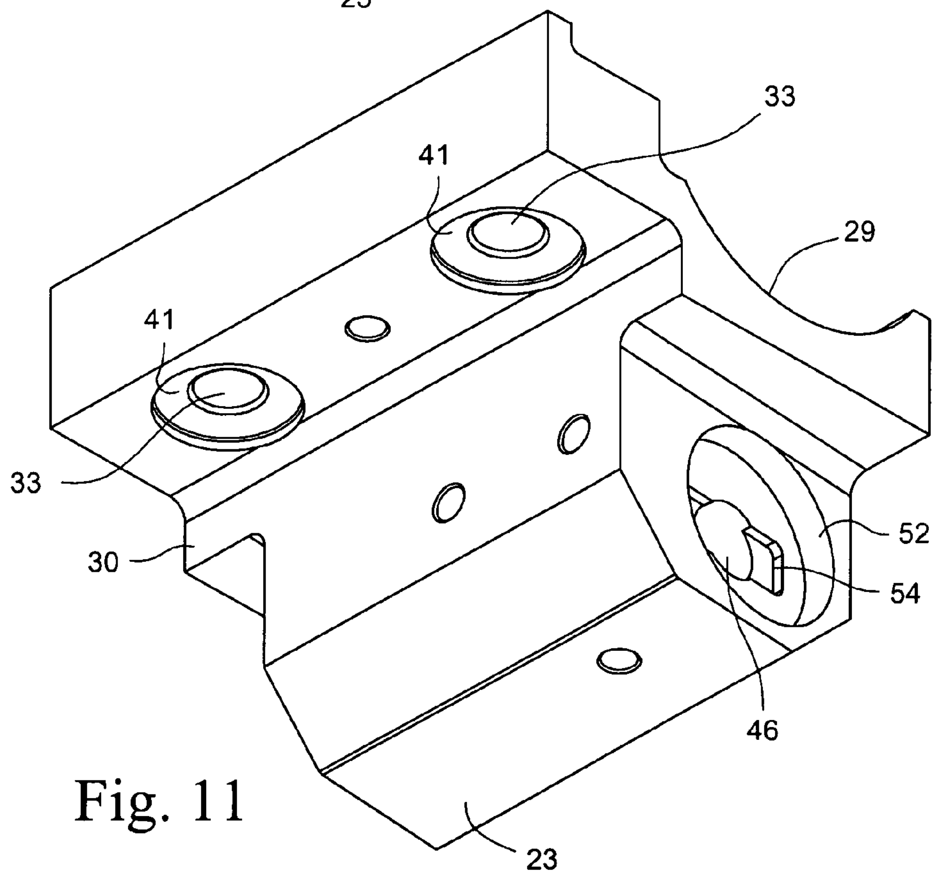
FIG. 11 is a bottom isometric view of a lower clamp body.

Different isometric views of the horizontal pipe clamp 22 subassembly are illustrated in FIGS. 6 and 7. The horizontal pipe clamp subassembly 22 consists of an upper clamp body 28, a lower clamp body 30, two clamp bolts 32, two clamp bolt keeper nuts 34, a stop bolt 36, a stop bolt keeper 38, a horizontal strut 40, strut nut keeper 42 and strut nut 44. These components are shown in FIGS. 8 through 22. The upper clamp body 28 (FIGS. 8 and 9) and the lower clamp body 30 (FIGS. 10 and 11) include an upper block 21 and a lower block 23, respectively, for receiving clamp bolts 32 used to join clamp bodies 28 and 30 together on opposite sides of the core spray line 10 in facing relation to one another.

The blocks 21 and 23 of clamp bodies 28 and 30 include through holes 33 for the insertion of clamp bolts 32 through blocks 21 and 23. Clamp bodies 28 and 30 are clamped in position on the core spray line 10 by virtue of a mechanical tensile force imposed by preferably two clamp bolts 32 that are inserted through holes 33 in blocks 21 and 23 of bodies 28 and 30 and that are held in position by clamp bolt keeper nuts 34 threaded over bolts 32.

Figure 23:
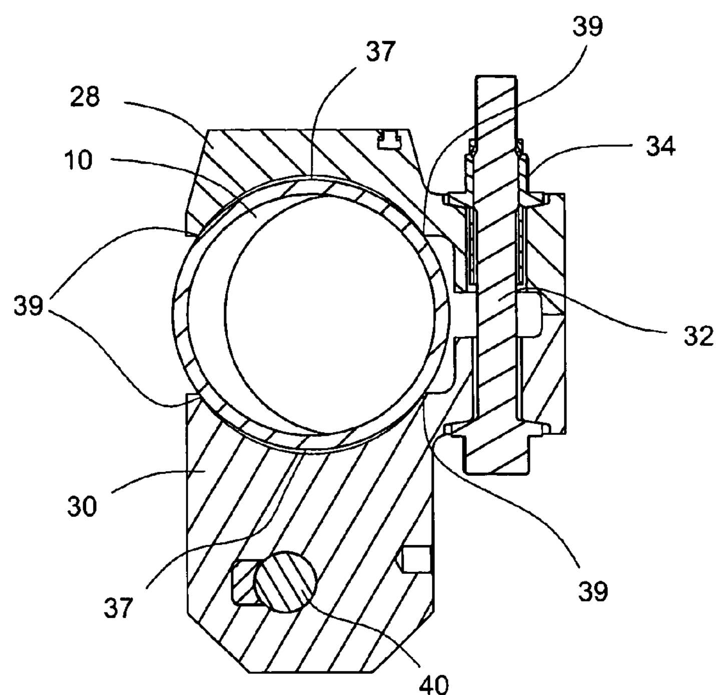
FIG. 23 is a cross sectional view of a horizontal pipe clamp subassembly.

The upper and lower clamp bodies 28 and 30, respectively, are machined to follow the curved contour of the core spray line 10. Cantilevered, or otherwise protruding from, upper block 21 and lower block 23 are an upper curved jaw 27 and a lower curved jaw 29, shown respectively, in FIGS. 8-9 and 10-11. Upper and lower curved jaws 27 and 29 have a specified radius of curvature for engaging the core spray line 10. Since the outside diameter of the core spray line can vary within specified manufacturing tolerances, the radius of curvature machined into the upper and lower curved jaws 27 and 29 of upper and lower clamp bodies 28 and 30 is slightly less than the nominal radius of curvature of the line 10. This ensures that the clamp bodies will interface with the core spray line as shown in the cross-sectional view of FIG. 23. As shown in FIG. 23, the upper and lower curved jaws 27 and 29 of the upper and lower clamp bodies 28 and 30 contact the core spray line 10 at four contact points 39, so as to form two engineered gaps 37 at points on line 10 between the line 10 and the upper and lower curved jaws 27 and 29. This arrangement prevents the upper clamp body 28 and/or the lower clamp body 30 from rocking on the exterior of the core spray line 10 over which they are installed, to thereby ensure that the clamp subassembly 22 engages the core spray line 10 in a stable manner.

Both the upper and lower clamp bodies 28 and 30 feature spherical seating surfaces 41, which mate with spherical seating surfaces 42 of the clamp bolt keeper nuts and clamp bolts, respectively. This ensures that no bending stresses will be imposed on the clamp bolts 32.

The upper clamp body 28 houses the stop bolt keeper 38, which is held captive in machined depressions 44 in the upper clamp body 28. The stop bolt keeper 38 is maintained captive at three separate locations by interfacing features shared by the keeper 38 and the upper clamp body 28. The stop bolt keeper 38 functions to prevent rotation of the stop bolt 36, and thus retain stop bolt preload.

Figure 15:
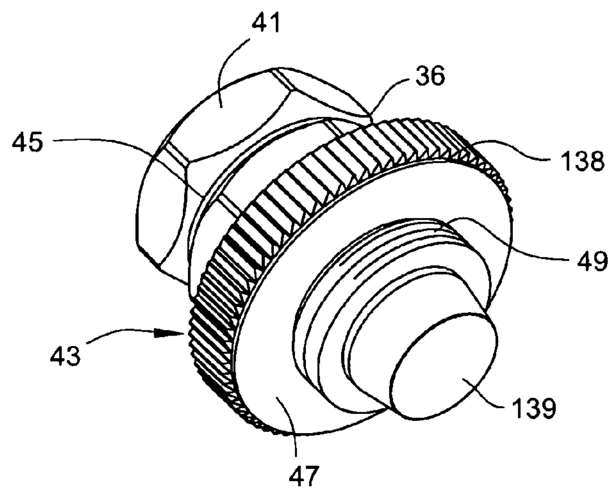
FIG. 15 is an isometric view of a stop bolt.

One embodiment of the stop bolt 36 is illustrated in FIG. 15. Preferably, the stop bolt 36 shown in FIG. 15 includes a hexagonal-shaped head 41 and a middle circular portion 43 with an enlarged diameter and a plurality of ratchet teeth 138 extending around the circumference of the middle circular portion 43. A "V" shaped groove 45 machined into the hexagonal head 41 of each of the stop bolts 36 is a tooling feature designed to facilitate retaining of the stop bolt 36 for remote delivery of such bolts into a reactor during installation of clamp assembly 20. Extending from a lower surface 47 of middle circular portion 43 is a threaded shaft 49 with a conical shaped end 139. Threaded shaft 49 facilitates the insertion of the stop bolt 36 into the clamp housings 28 and 74.

A through hole 46, which receives the strut 40 is incorporated into the design of the lower clamp body 30. The smaller counter-bore 48 at one end of the lower clamp body 30, receives the proximal or "head" end 50 of the strut 40. At the opposite end of the lower clamp body 30, a larger counter-bore 52 is provided with an accompanying rectangular-shaped depression 54 or "keyway" feature. It is into this larger counter-bore 52 that the strut nut keeper 42 interfaces with the lower clamp body 30. The "key" 56 of the strut nut keeper 42 mates with the rectangular "keyway" 54 in the lower clamp body 30, inhibiting rotational movement of the strut nut keeper 42 with respect to the lower clamp body 30. The strut nut 44, threaded onto the distal end 58 of the strut 40, is received into and thus bears against the strut nut keeper 42. Additionally, the teeth 60 of the strut nut interface with mating teeth 62 of the strut nut keeper 42, which allow rotation of the strut nut 44 only in the direction that increases mechanical preload in the strut 40, and thereby prevents loosening and resultant loss of strut preload.

Figure 12:
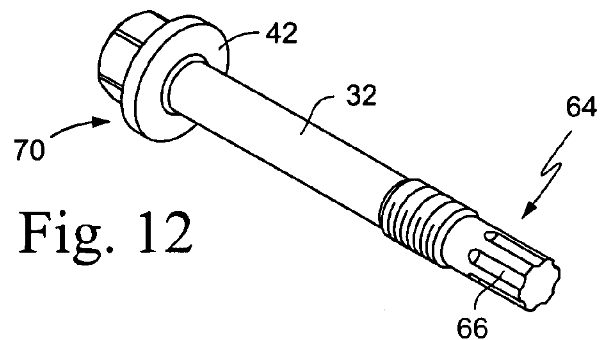
FIG. 12 is an isometric view of a clamp bolt.

The clamp bolt 32 is shown in FIG. 12. The distal end 64 of the clamp bolt 32 is machined to a diameter slightly smaller than the inside diameter of the clamp bolt keeper nut 34, and is machined with flutes 66 to facilitate crimping of a thin-walled crimp collar 68 of the clamp bolt keeper nut 34 over the flutes 66 of clamp bolt 32. The proximal end 70 of the clamp bolt 32 incorporates a spherical seating surface 42, which interfaces with spherical seating surface 41 of lower clamp body 30.

Figure 13:
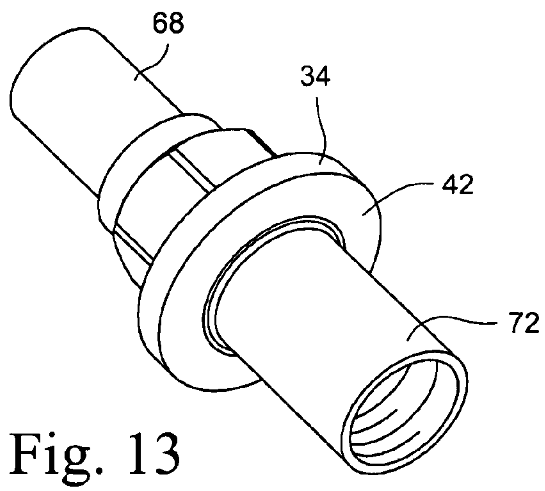
FIG. 13 is an isometric view of a clamp bolt keeper nut.
Figure 14:
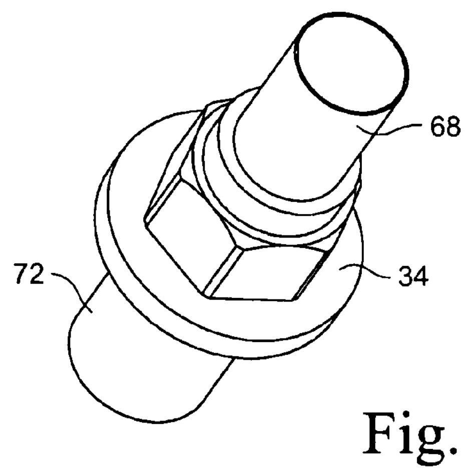
FIG. 14 is another isometric view of a clamp bolt keeper nut of FIG. 13.

The clamp bolt keeper nut 34 is shown in isometric representation in FIGS. 13 and 14. Notable features are the spherical seating surface 42, which interfaces with spherical seating surfaces 41 of upper clamp body 28, the cylindrical thin-walled crimp collar 68, and an extension collar 72 with internal threads. This threaded extension 72 facilitates remote installation of the clamp assembly 20. The threaded extension collar 72 of the clamp bolt keeper nut 34 allows the upper and lower clamp bodies 28 and 30 to be separated sufficiently to pass over the outside diameter of the horizontal core spray line 10 before they are finally bolted together by tightening clamp bolt keeper nuts 34 on clamp bolts 32.

Figure 24:
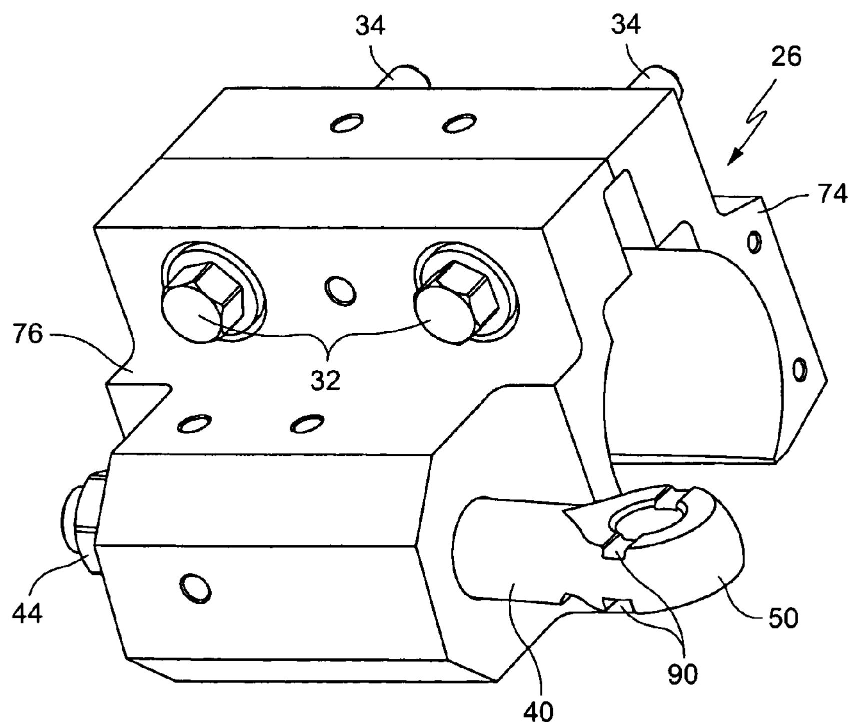
FIG. 24 is an isometric view of a downcomer clamp subassembly.
Figure 25:
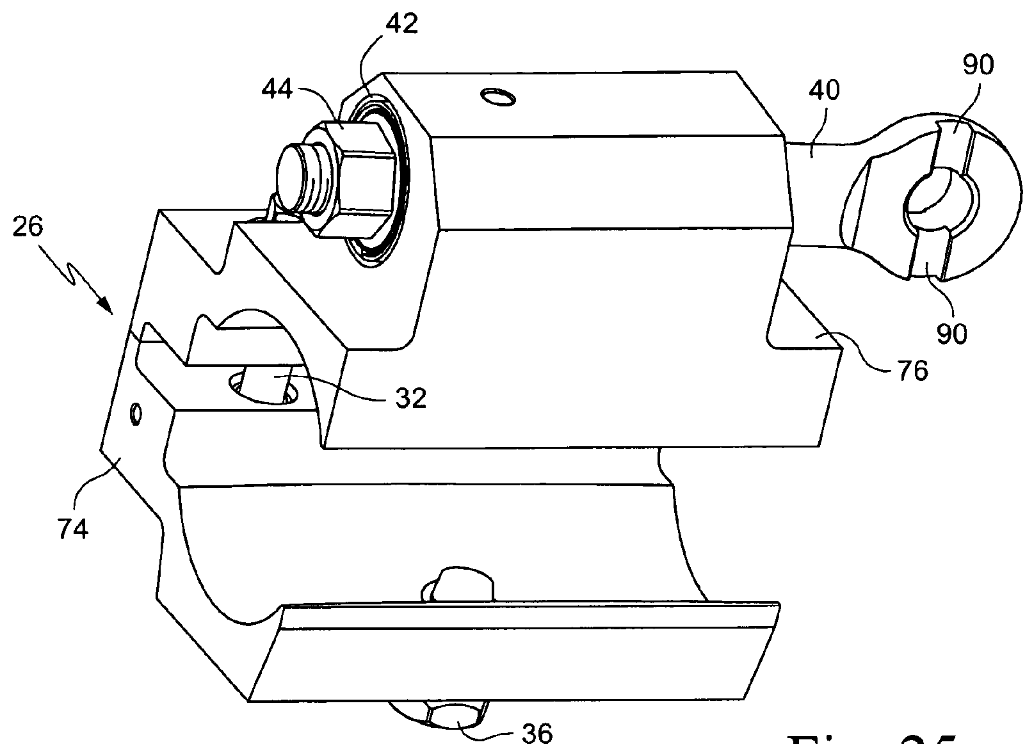
FIG. 25 is another isometric view of the downcomer clamp subassembly of FIG. 24.

The downcomer clamp subassembly 26 is illustrated in FIGS. 24 and 25. The main components that comprise the downcomer clamp subassembly 26 are an outboard clamp body 74 and an inboard clamp body 76. These two components are shown in FIGS. 26 through 29. The remaining components that make up the downcomer clamp subassembly 26 are identical to those associated with the horizontal pipe clamp subassembly 22. The common parts are the clamp bolts 32, the clamp bolt keeper nuts 34, stop bolt 36, stop bolt keeper 38, strut 40, strut nut keeper 42, and strut nut 44. These parts are referenced in FIGS. 12 through 22. The outboard clamp body 74 (FIGS. 26 and 27) and the inboard clamp body 76 (FIGS. 28 and 29) include an outboard block 71 and a inboard block 73, respectively, for receiving clamp bolts 32 used to join clamp bodies 74 and 76 together on opposite sides of the core spray downcomer line 18 in facing relation to one another.

The blocks 71 and 73 of clamp bodies 74 and 76 include through holes 33 for the insertion of clamp bolts 32 through blocks 71 and 73. Here again, the clamp bodies 74 and 76 of the downcomer clamp subassembly 26 are clamped in position by the mechanical preload of the clamp bolts 32 and clamp bolt keeper nuts 34 acting through the clamp bodies 74 and 76.

The outboard and inboard clamp bodies 74 and 76, respectively, are machined to follow the curved contour of the downcomer pipe 18. Cantilevered, or otherwise protruding from, outer block 71 and inner block 73 are an outboard curved jaw 77 and an inboard curved jaw 79, shown respectively, in FIGS. 26-27 and 28-29. Outboard and inboard curved jaws 77 and 79 have a specified radius of curvature for engaging the downcomer pipe 18. Since the outside diameter of the downcomer pipe 18 may vary within specified manufacturing tolerances, the radius of curvature machined into the outboard and inboard clamp bodies 74 and 76 is slightly less than the nominal radius of curvature of the downcomer 18. This ensures that the clamp bodies 74 and 76 will interface with the downcomer pipe 18 as shown in the cross-sectional view of FIG. 30.

Figure 30:
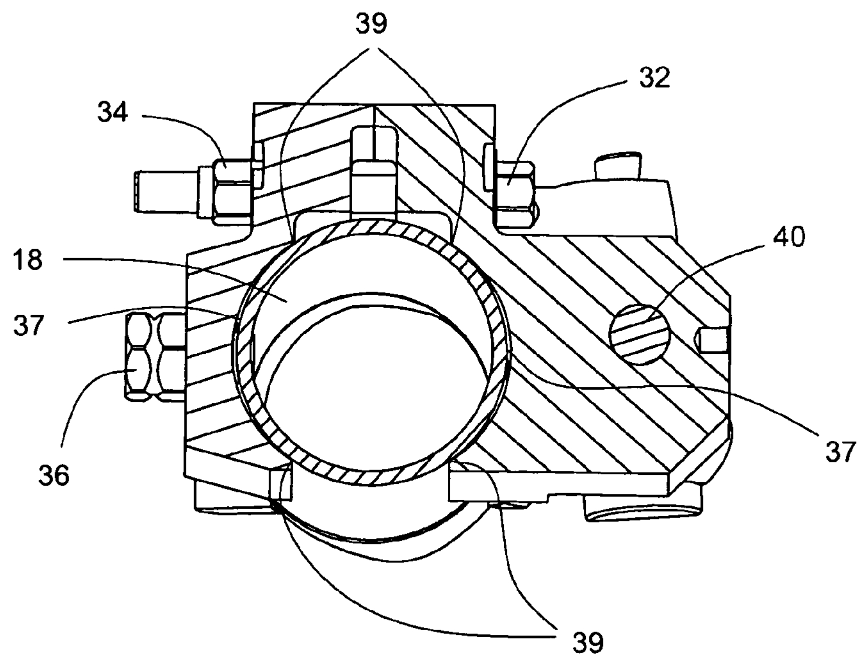
FIG. 30 is a cross sectional view of a downcomer clamp subassembly.

As shown in FIG. 30, the outboard and inboard curved jaws 77 and 79 of the outboard and inboard clamp bodies 74 and 76 contact the core downcomer pipe 18 at four contact points 39, so as to form two engineered gaps 37 at points on line 18 between the line 18 and the outboard and inboard curved jaws 77 and 79. This arrangement prevents the outboard clamp body 74 and/or the inboard clamp body 76 from rocking on the exterior of the core spray downcomer line 18 over which they are installed, to thereby ensure that the clamp assembly 26 engages the core spray downcomer line 18 in a stable manner.

Both the outboard and inboard clamp bodies 74 and 76 feature spherical seating surfaces 41, which mate with spherical seating surfaces 42 of the clamp bolt keeper nuts 34 and clamp bolts 32, respectively. This ensures that no bending stresses will be imposed on the clamp bolts 32. The outboard clamp body 74 houses the stop bolt keeper 38, which is held captive in machined depressions 44 in the outboard clamp body 74. The stop bolt keeper 38 is maintained captive at three separate locations by interfacing features shared by the keeper and the outboard clamp body 74. The function of the stop bolt keeper 38 is to prevent rotation of the stop bolt 36 and thus retain stop bolt preload.

As noted earlier in the discussion, the clamp bolts 32 and clamp bolt keeper nuts 34 associated with the downcomer clamp subassembly 26 are identical to those associated with the horizontal clamp subassembly 22. Referring to FIG. 12, the distal end 64 of these bolts 32 is machined to a diameter slightly smaller than the inside diameter of the clamp bolt keeper nut crimp collar 68. Also, six equally spaced flutes 66 are provided to facilitate crimping of the thin-walled crimp collar 68 of the clamp bolt keeper nut 34 over the flutes 66 of clamp bolt 32. The spherical seating surface 42 at the proximal end 70 of the clamp bolt interfaces with the spherical seating surface 41 of the inboard clamp body 76.

The clamp bolt keeper nut 34 is shown in isometric representation in FIGS. 13 and 14. Here again, notable features of the clamp bolt keeper nut are the spherical seating surface 42, which interfaces with the spherical seating surface 41 in the outboard clamp body 74, the cylindrical thin-walled crimp collar 68, and the extension collar 72 with internal threads. The threaded extension 72 allows remote installation of the clamp subassembly 26. The threaded extension collar 72 of the clamp bolt keeper nut 34 allows the outboard and inboard clamp bodies 74 and 76 to be separated sufficiently to pass over the outside diameter of the downcomer pipe 18 before they are finally bolted together by tightening clamp bolt keeper nuts 34 on clamp bolts 32.

Figure 4:
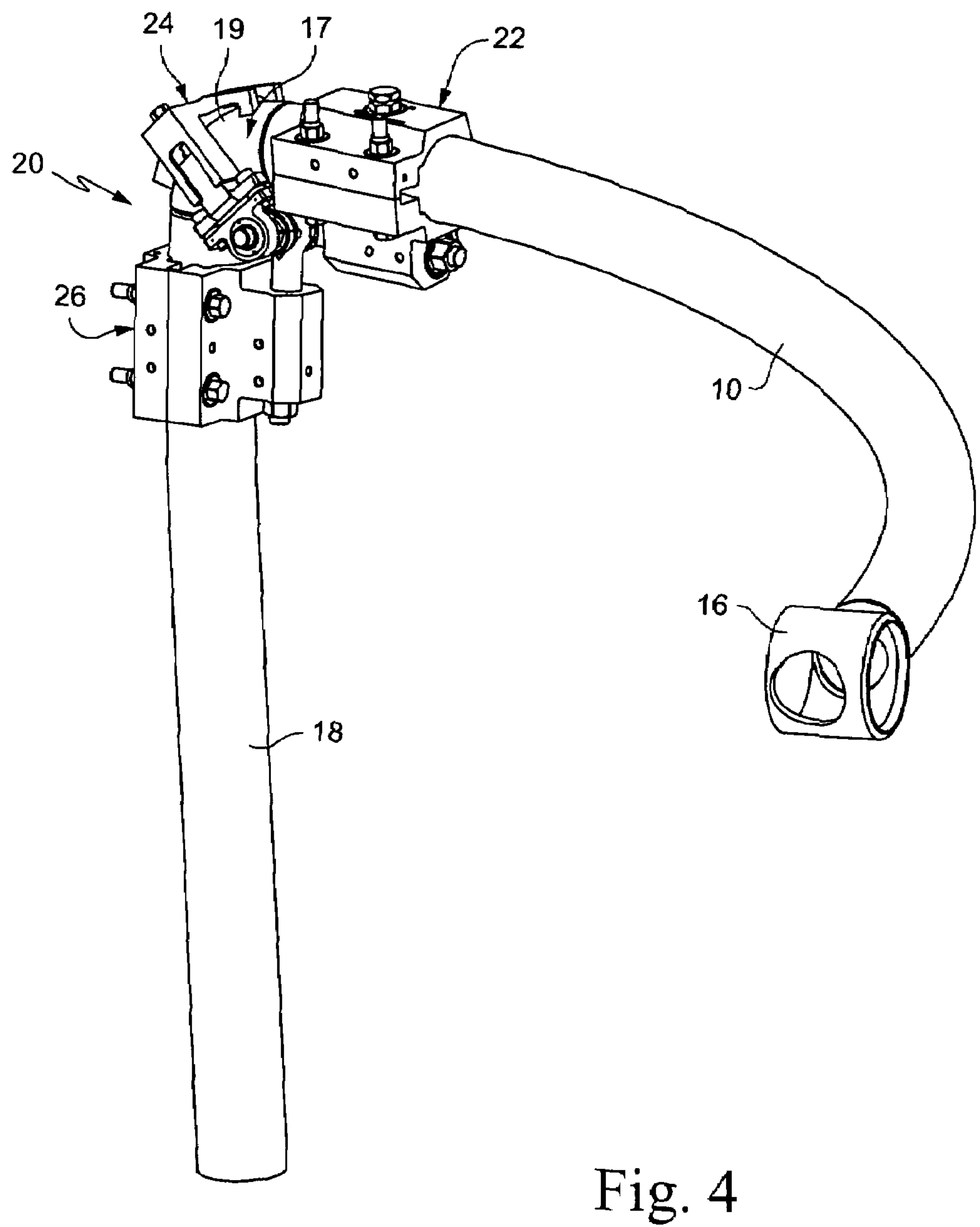
FIG. 4 is another isometric view of the disclosed embodiment of the elbow clamp assembly installed on the short radius elbow.
Figure 5:
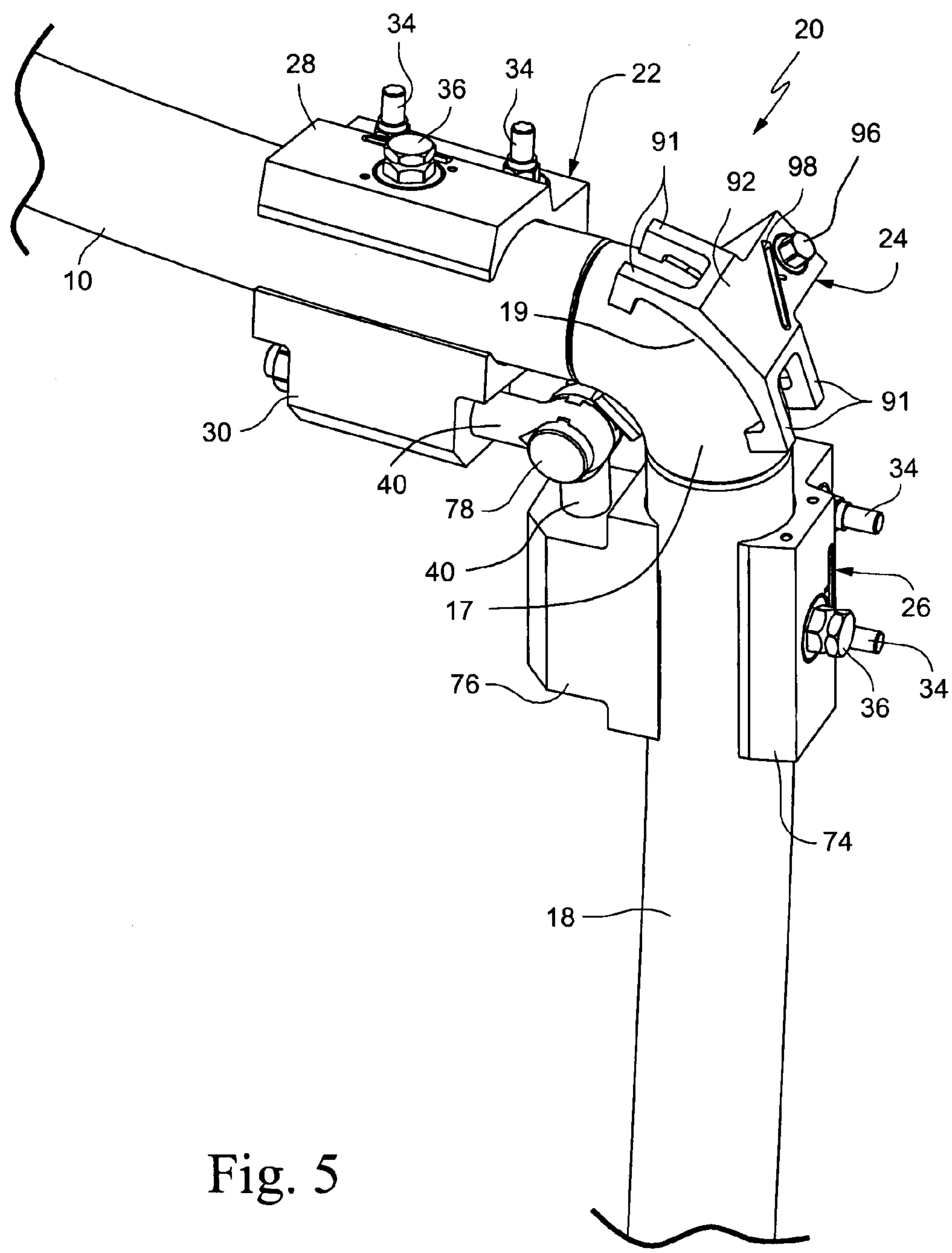
FIG. 5 is another isometric view of the disclosed embodiment of the elbow clamp assembly installed on the short radius elbow.
Figure 31:
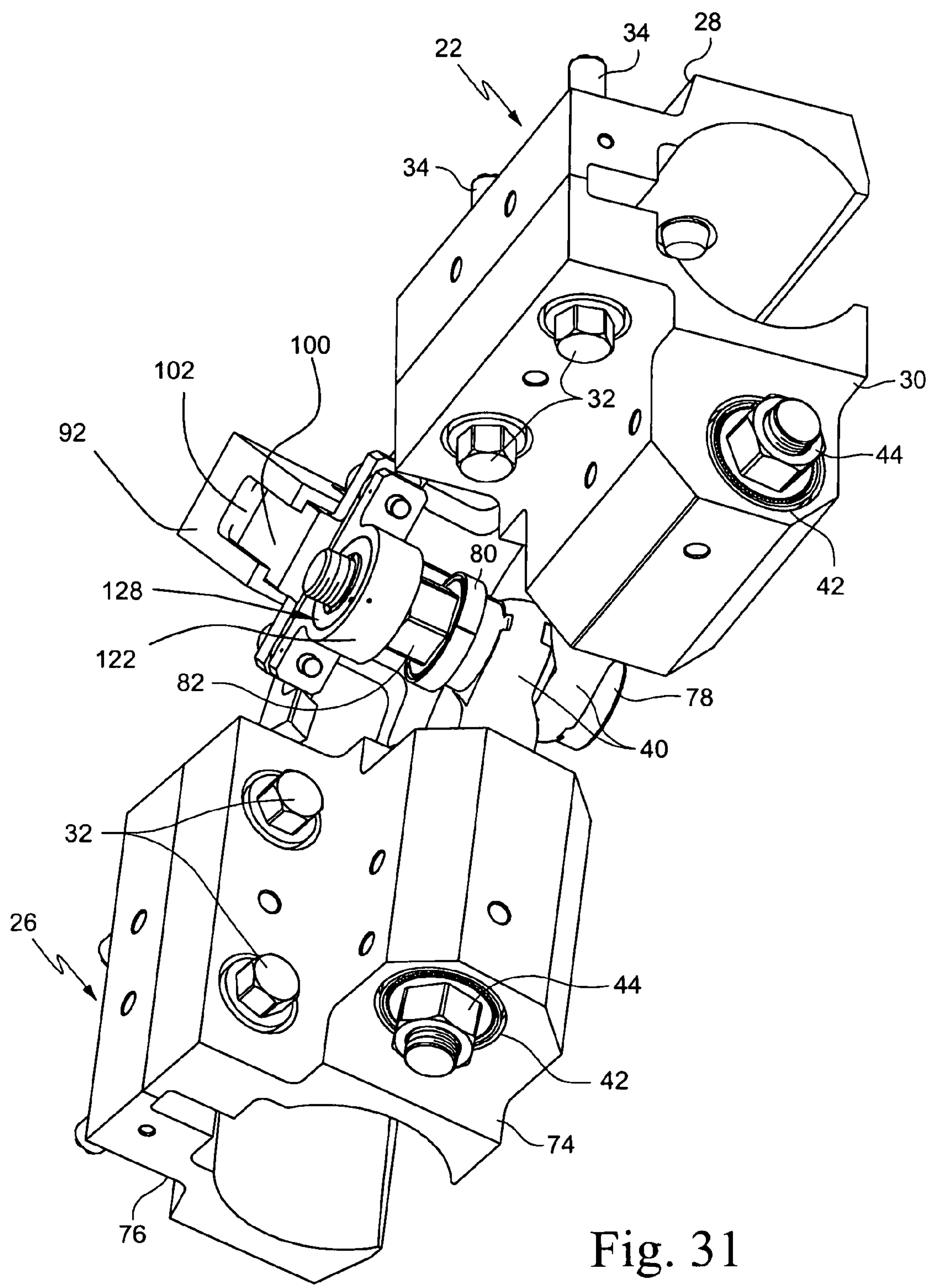
FIG. 31 is an isometric view of a clamp assembly for repairing weld joints connecting an elbow between a core spray line and a downcomer pipe.
Figure 32:
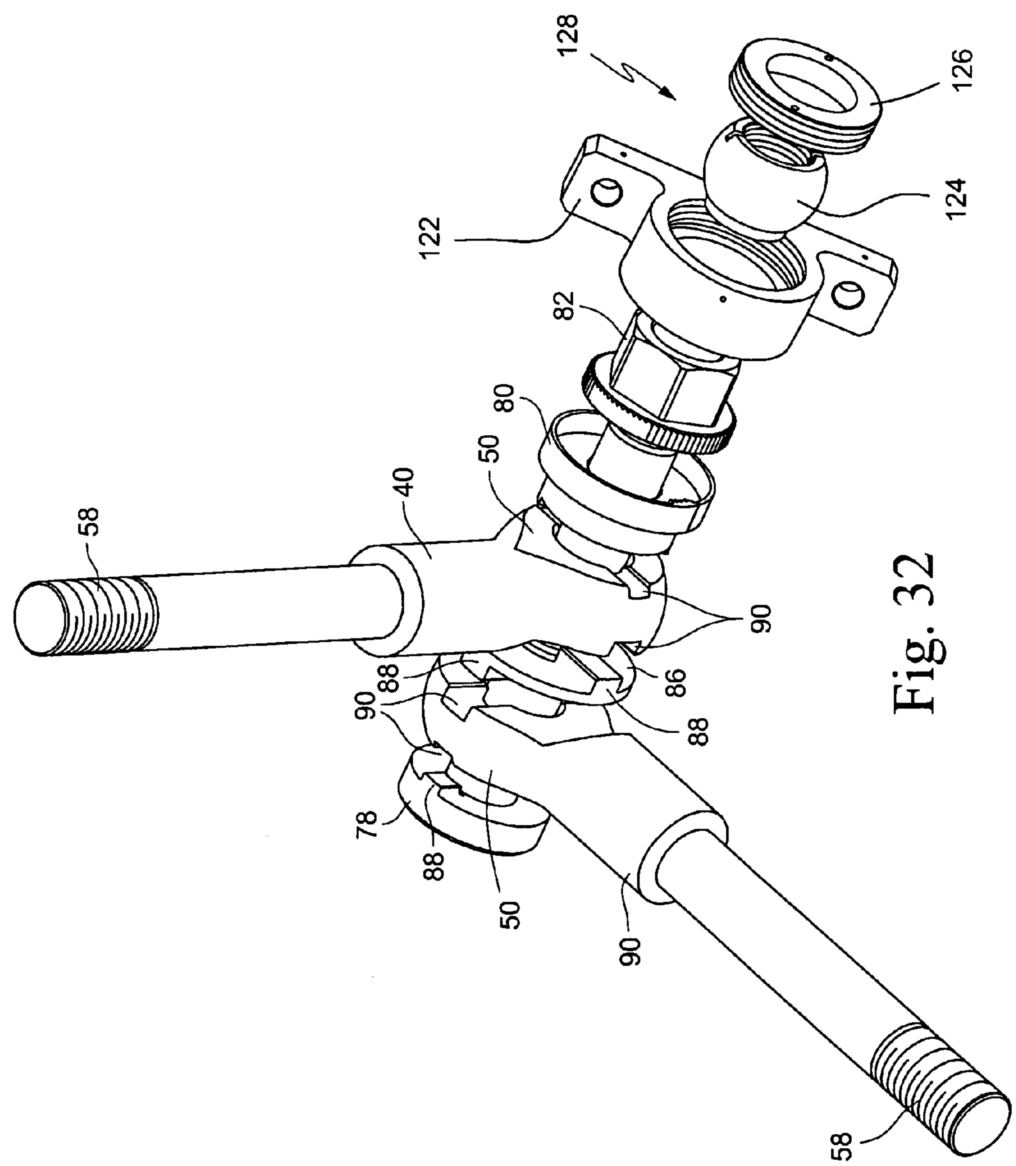
FIG. 32 is an exploded view of the connector bolt and associated components of FIG. 31.
Figure 33A:
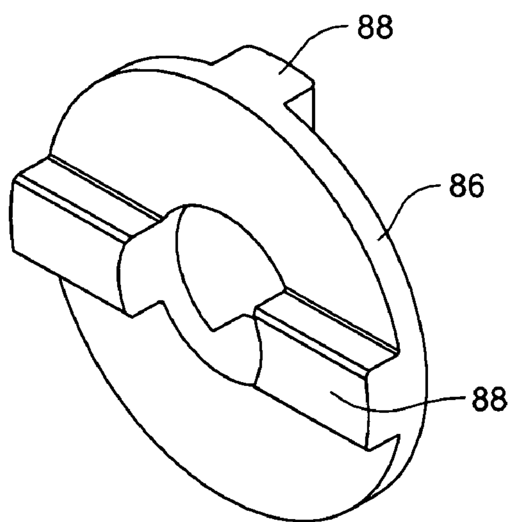
FIGS. 33(*a*) and (*b*) are isometric views of a strut spacer.
Figure 33B:
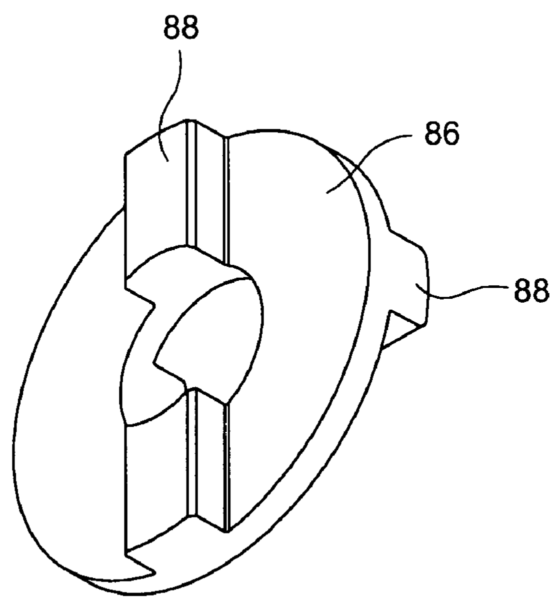

The strut element 40 of the horizontal clamp subassembly 22 is joined to the strut element 40 of the downcomer clamp 26 by a connector bolt 78 (FIGS. 4 and 5). The other components, in addition to the struts 40 and connector bolt 78 that make up this joint are the strut spacer 86, connector bolt nut keeper 80, and connector bolt nut 82. Also, other components associated with the elbow restraint subassembly are attached to the threaded end 84 of the connector bolt 78, and will be discussed later. The connector bolt 78 and its associated components are shown in isometric representation in FIG. 31 and in exploded representation in FIG. 32. Due to the variance expected in the as-built geometry of the core spray line, the interfacing space between the respective struts 40 will vary accordingly. As a result, a "field" measurement is obtained, which dictates the machined thickness of a strut spacer 86. The strut spacer 86 is essentially a washer with "keys" 88 on opposite faces which are oriented at an angle of preferably 90 degrees with respect to one another, although it should be noted that other angles may result. This angle is a function of the as-built angular configuration of the horizontal and downcomer piping. In order to prevent rotational movement between the struts 40 of the horizontal piping clamp and the downcomer clamp subassemblies 22 and 26, the connector bolt 78, struts 40, strut spacer 86, and connector bolt nut keeper 80 all feature interfacing "keys" 88 and "keyways" 90. These components are illustrated in FIGS. 17-18, 21-22 and 33-36.

Figure 1:
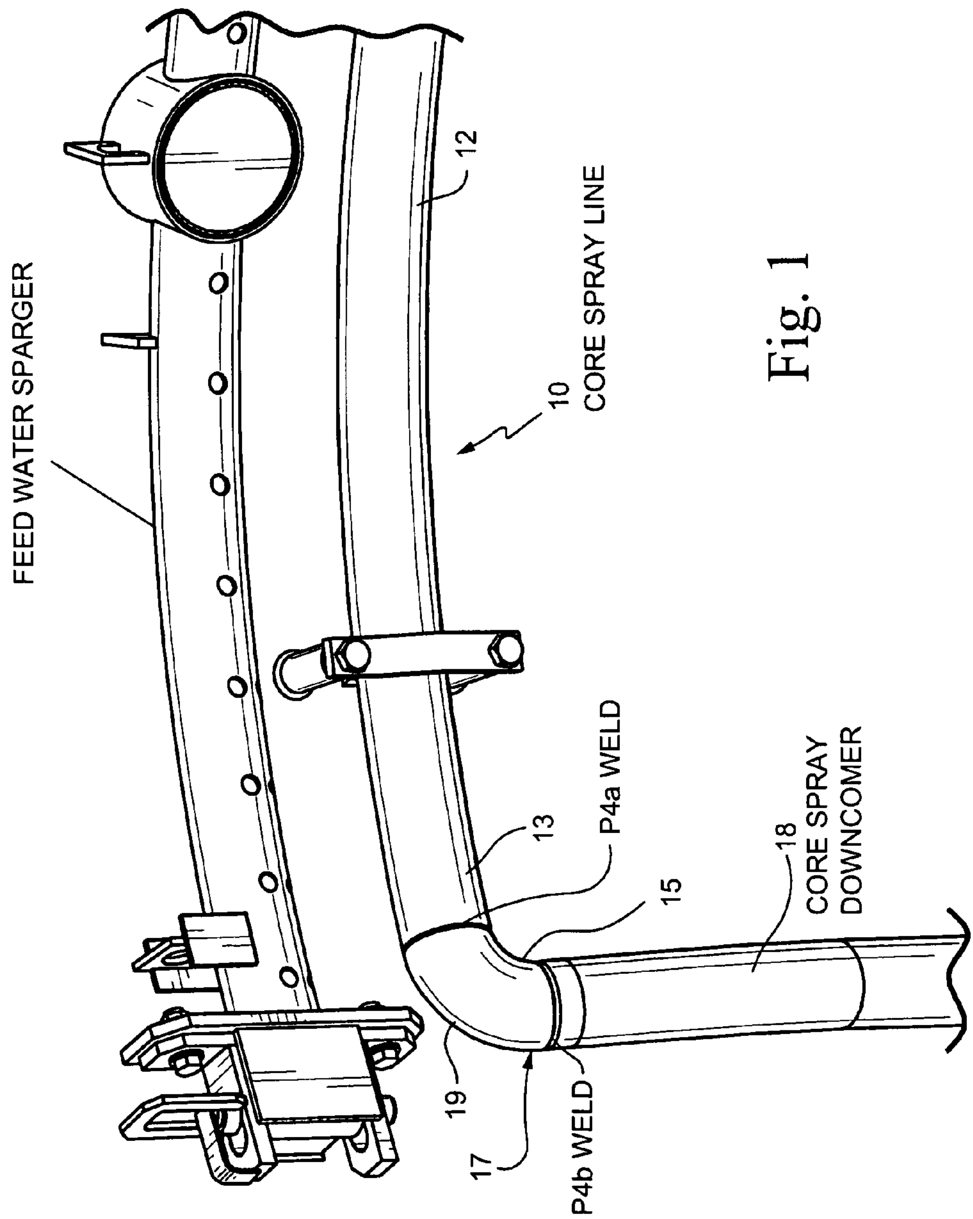
FIG. 1 is an isometric view of a core spray line by the distal end near the short radius elbow.
Figure 2:
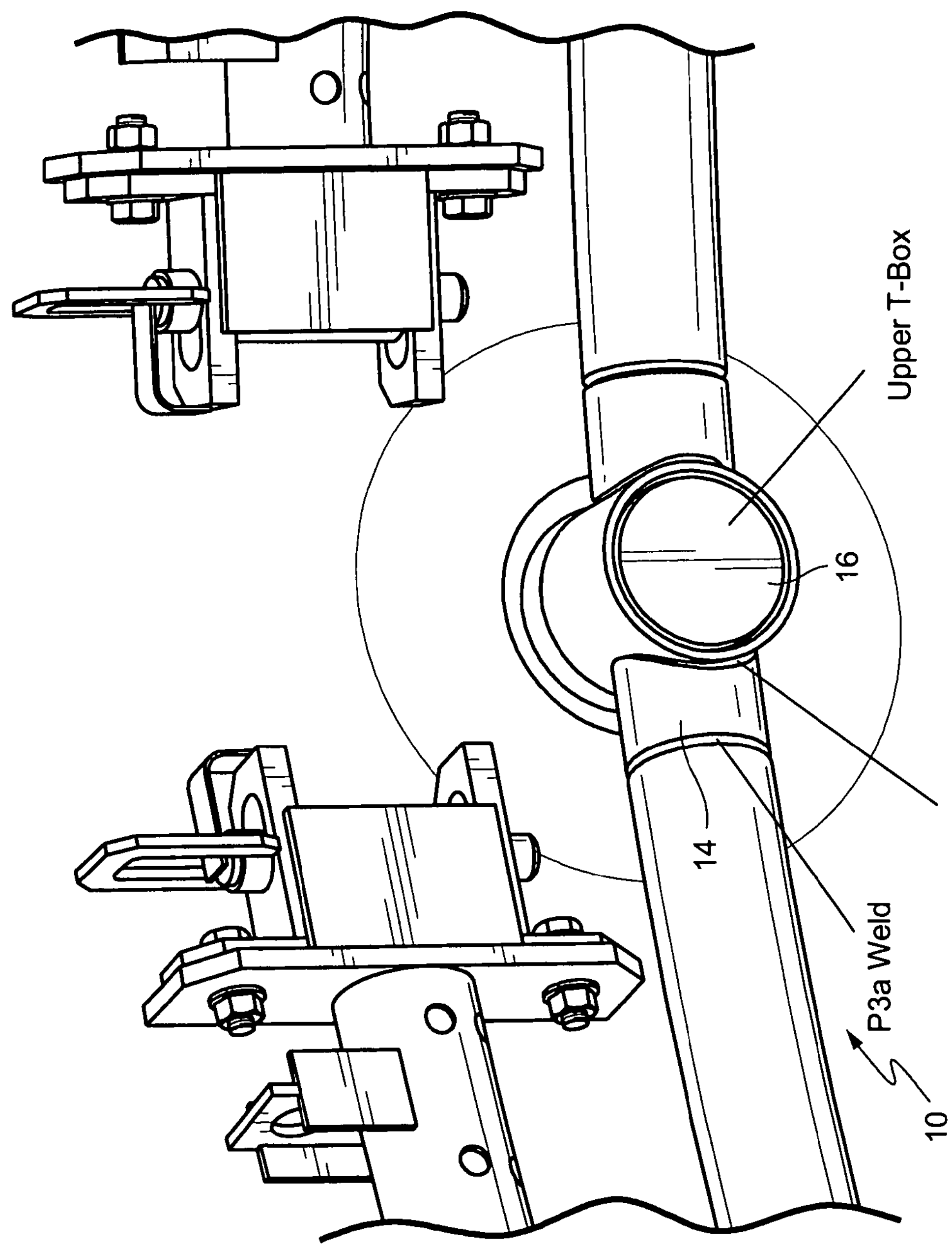
FIG. 2 is an isometric view of the core spray line of FIG. 1, but by the proximal end near the T-Box.
Figure 3:
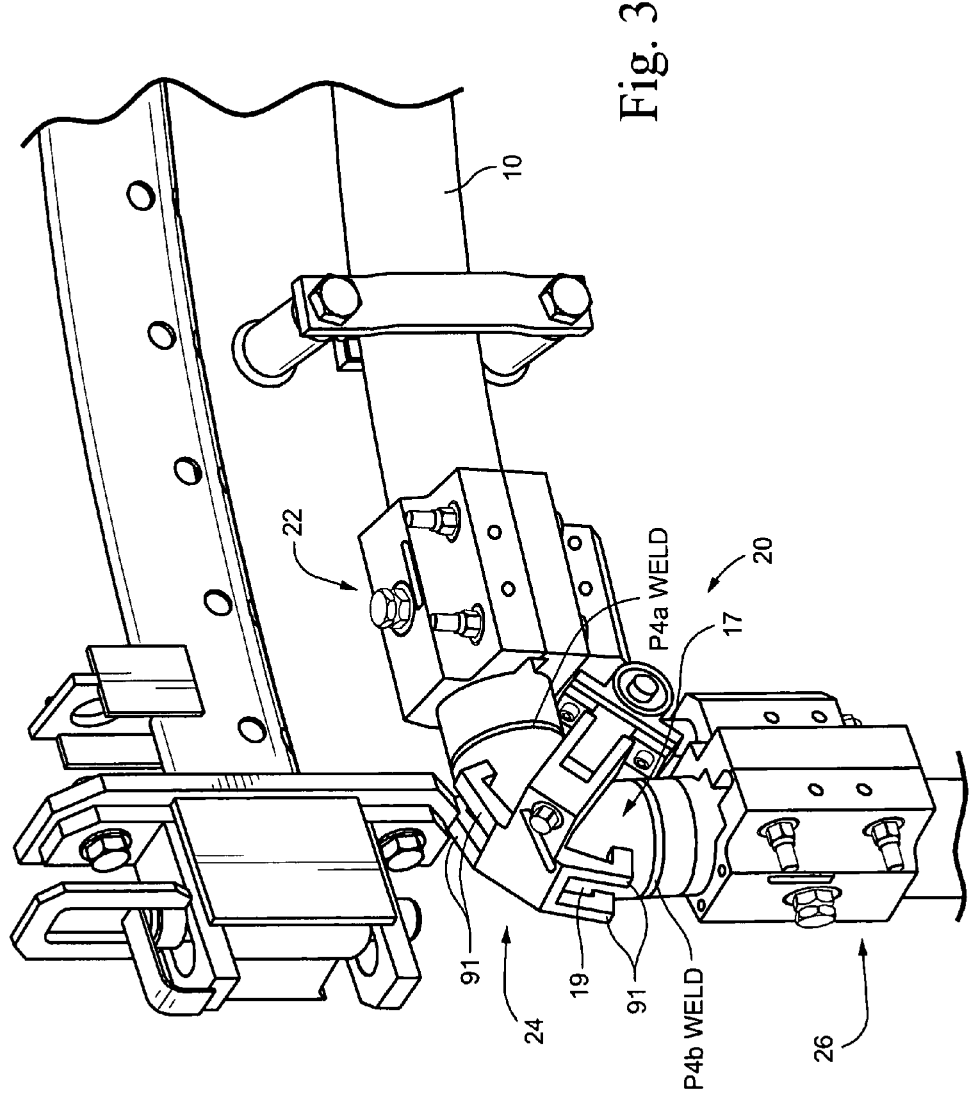
FIG. 3 is a top isometric view of an embodiment of the elbow (P4a/P4b Weld) clamp assembly installed on the short radius elbow.
Figure 37:
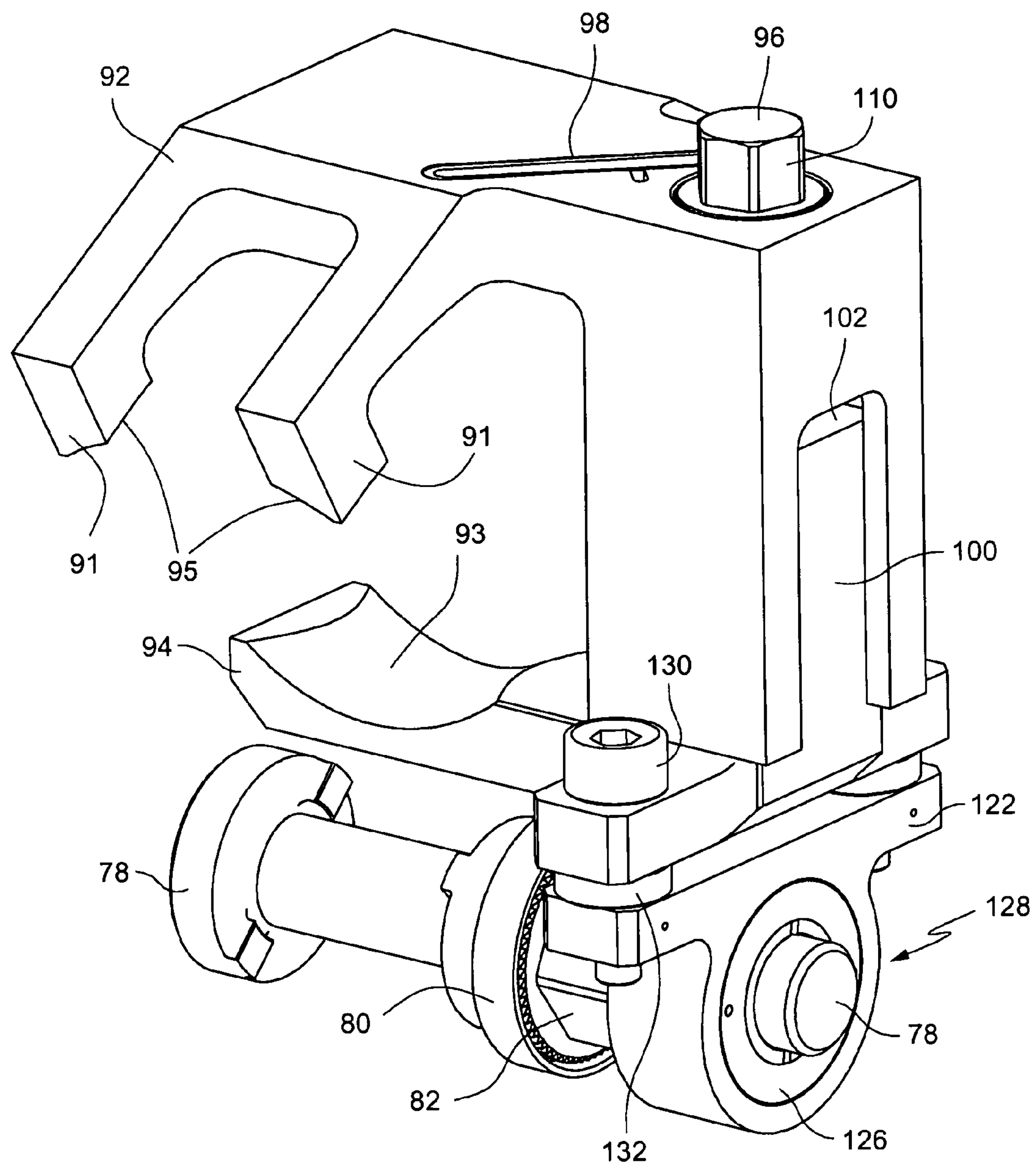
FIG. 37 is an isometric view of an elbow restraint subassembly.
Figure 38:
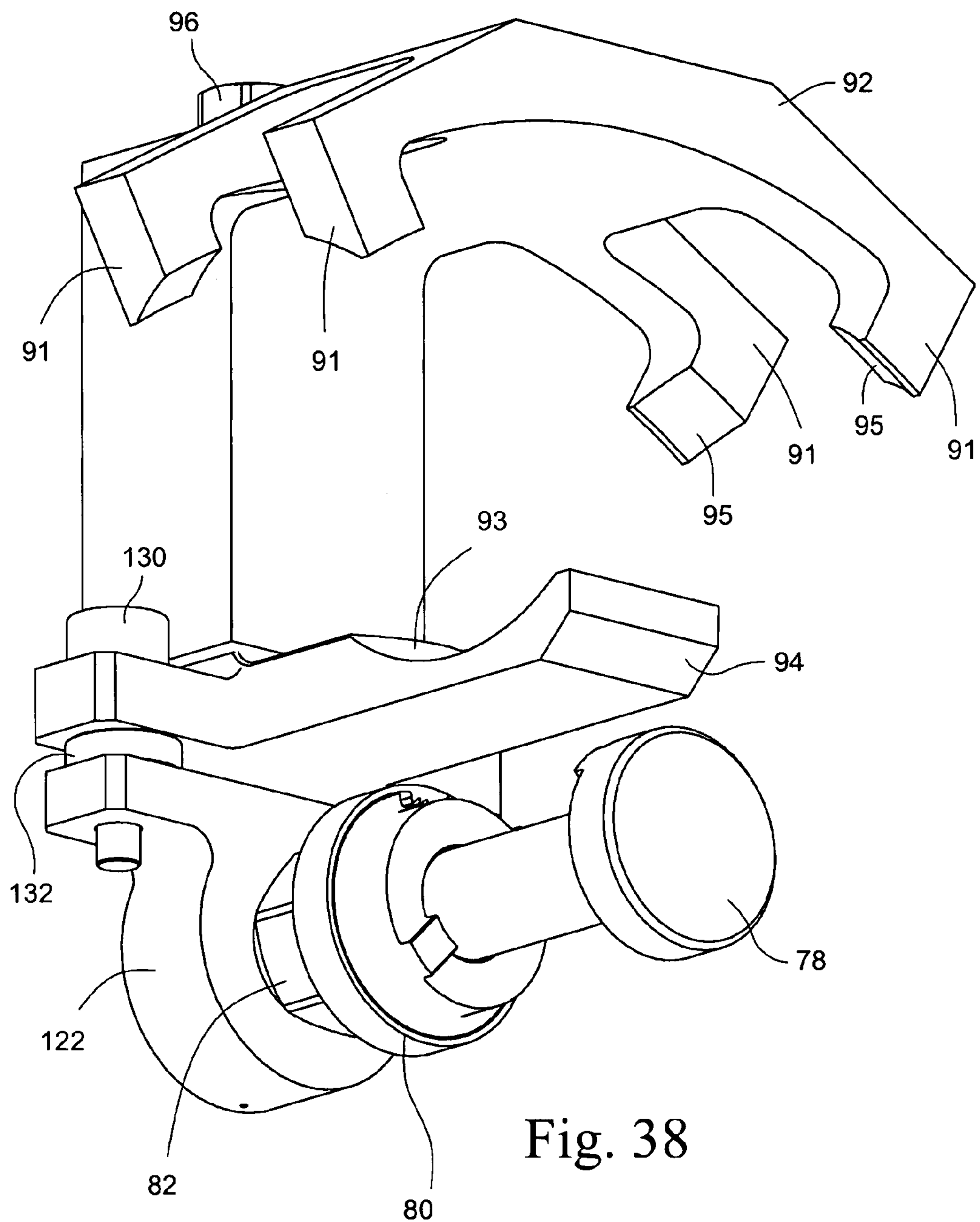
FIG. 38 is another isometric view of the elbow restraint subassembly of FIG. 37.
Figure 39:
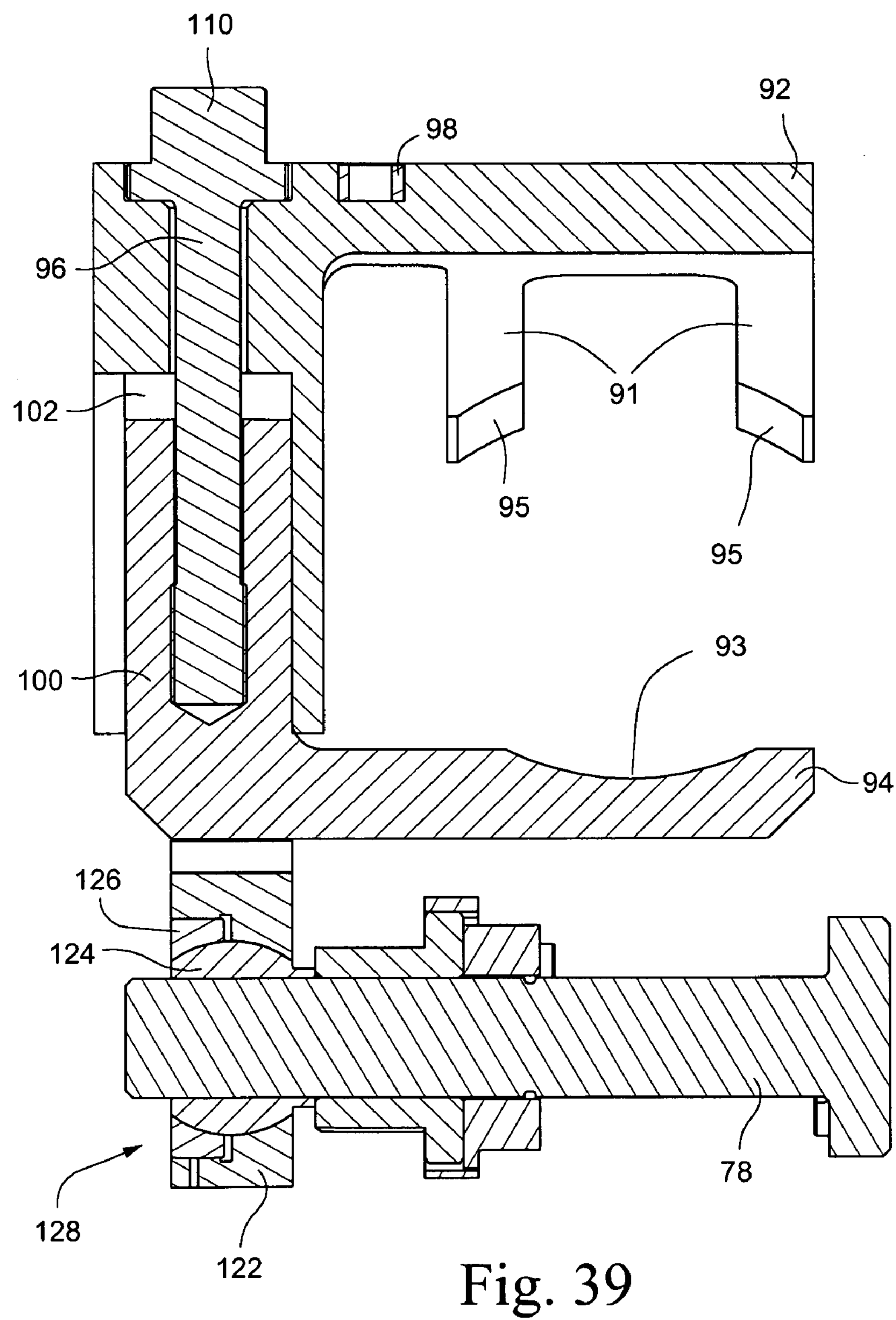
FIG. 39 is a cross sectional view of the elbow restraint subassembly of FIGS. 37 and 38.
Figure 40:
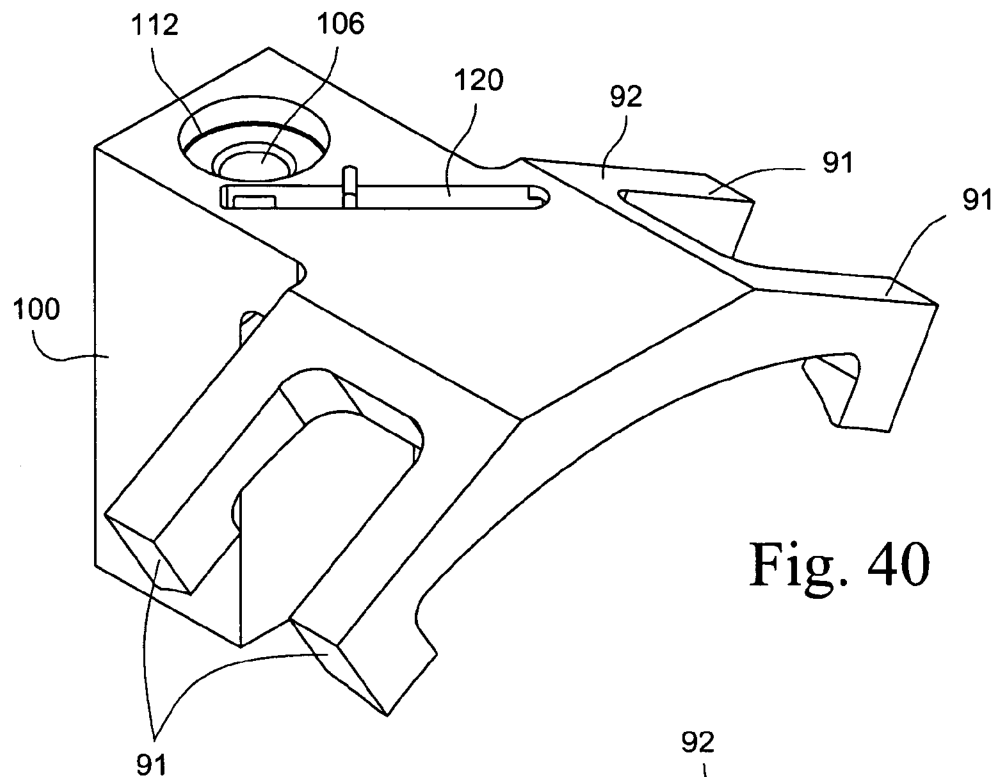
FIG. 40 is an isometric view of an outboard elbow restraint.
Figure 41:
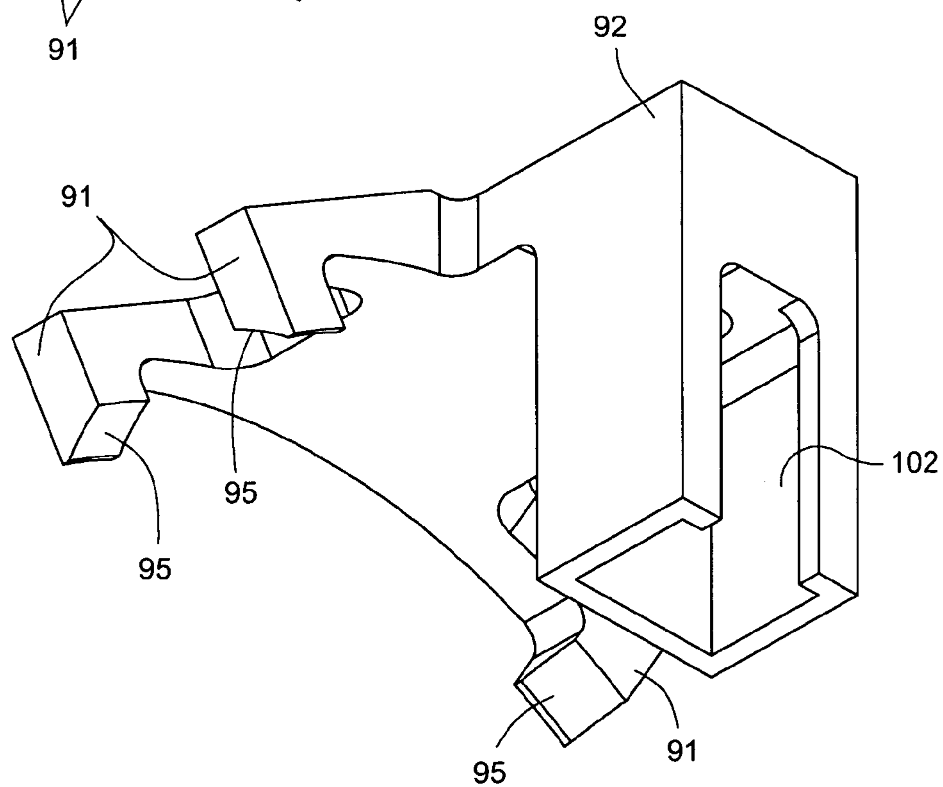
FIG. 41 is another isometric view of the outboard elbow restraint of FIG. 40.
Figure 42:
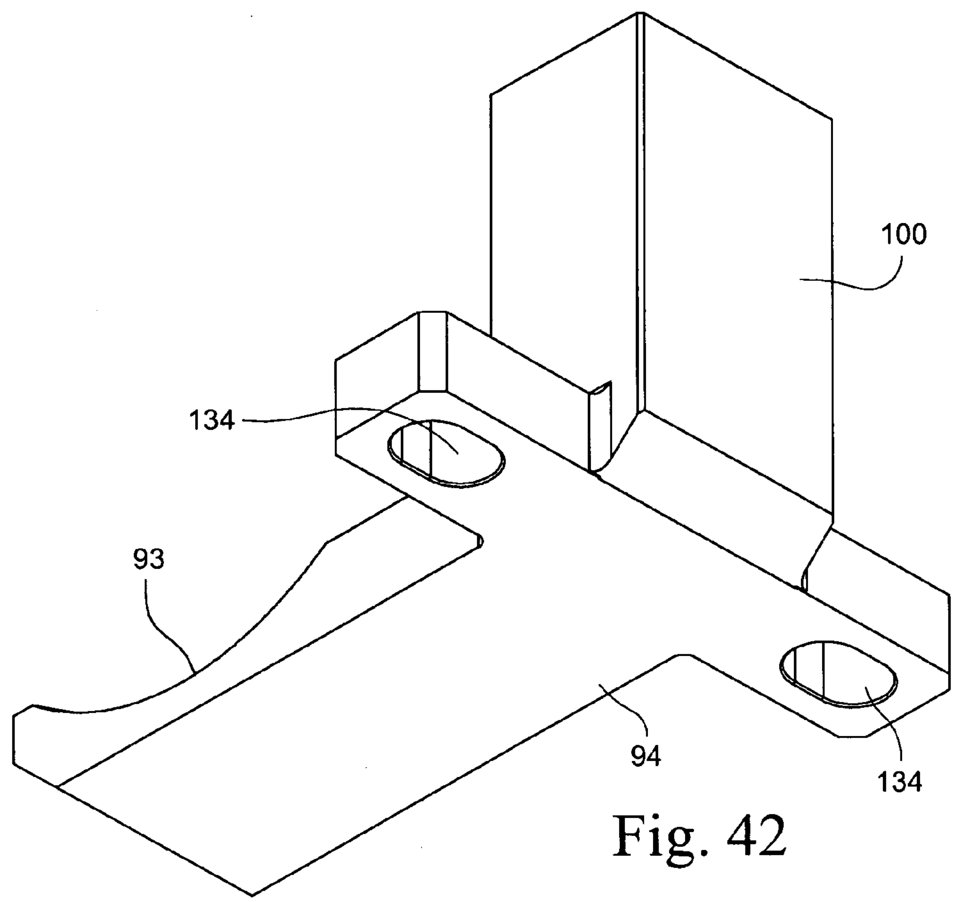
FIG. 42 is an isometric view of an inboard elbow restraint.
Figure 43:
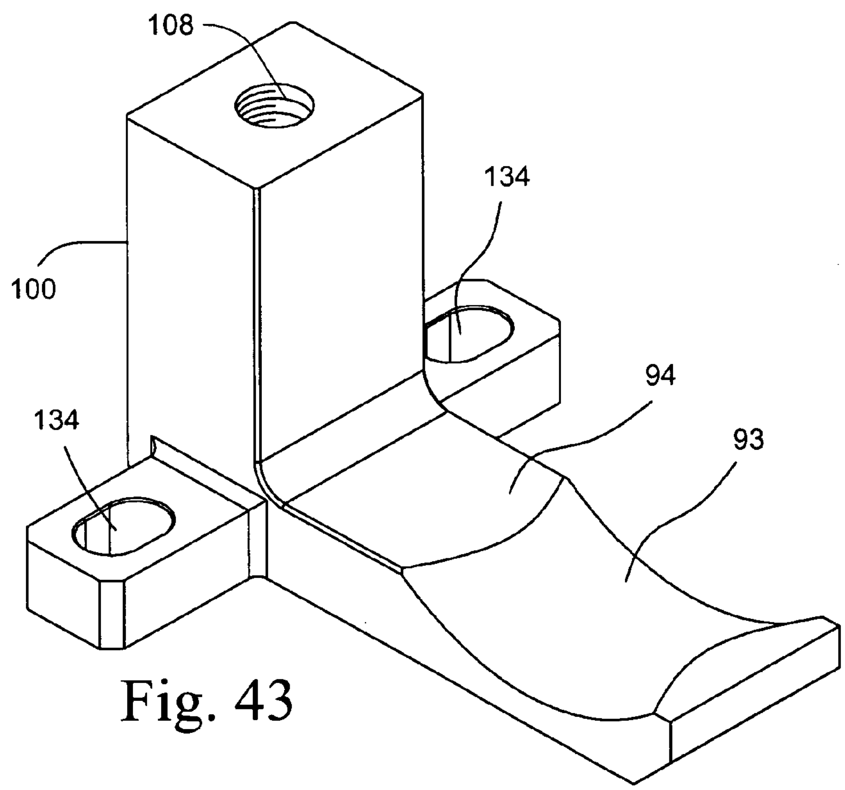
FIG. 43 is another isometric view of the inboard elbow restraint of FIG. 42.

The clamping elements of the elbow restraint subassembly 24 consist of an outboard elbow restraint 92, an inboard elbow restraint 94, an elbow restraint bolt 96, and an elbow restraint bolt keeper 98. These components are shown as integral parts of the elbow restraint subassembly in FIGS. 37-39. The elbow restraint subassembly 24 is positioned and attached to the threaded end 84 of the connector bolt 78 as shown in FIGS. 37-39. The outboard and inboard elbow restraints 92 and 94 are extended, such that the elbow restraint subassembly 24 is installed over the short radius elbow 17 at the same time that the horizontal and downcomer clamp subassemblies 22 and 26 are installed onto the core spray line 10 and the downcomer pipe 18. The outboard elbow restraint 92 and inboard elbow restraint 94 are machined to conform to the contour of the short radius elbow 17. These components are illustrated in FIGS. 40-43. As can be seen from these figures, the outboard elbow restraint 92 includes four fingers 91 that are angled and machined to conform to the outside radius 19 of elbow 17, as shown in FIGS. 3-5. Specifically, each of fingers 91 includes a curved end surface 95 shaped to conform to the outside radius 19 of elbow 17. In addition, the inboard elbow restraint 94 has a curved cradle-like protrusion 93 that is machined to conform to the inside radius 15 of elbow 17. Thus, when elbow restraint subassembly 24 is positioned and clamped to the short radius elbow 17, as shown in FIGS. 3-5, the fingers 91 of outboard elbow restraint 92 engage the outside radius 19 of elbow 17, while the cradle-like extension 93 of inboard elbow restraint 94 engages the inside radius 15 of elbow 17 in facing relation to the fingers 91 of outboard elbow restraint 92.

Figure 44:
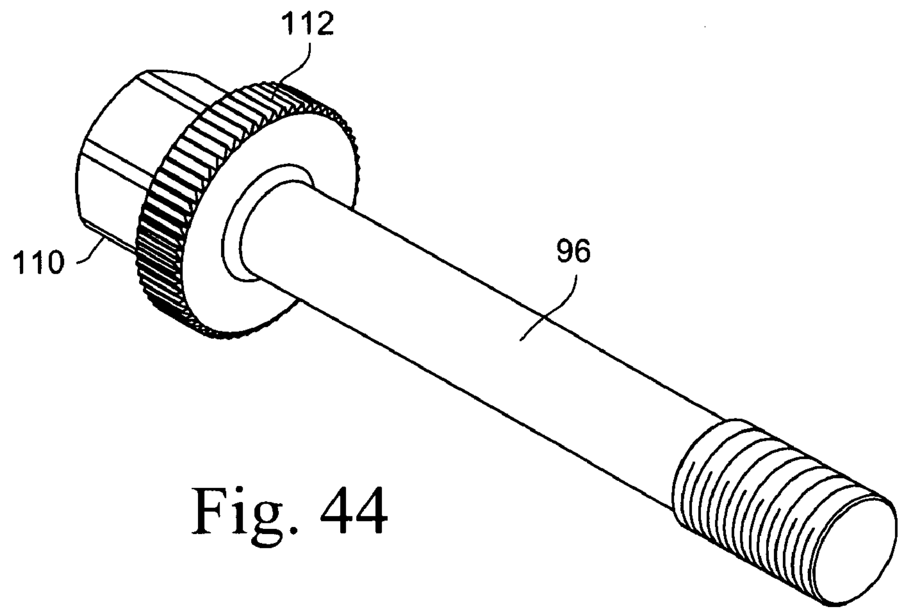
FIG. 44 is an isometric view of an elbow restraint bolt.
Figure 45:
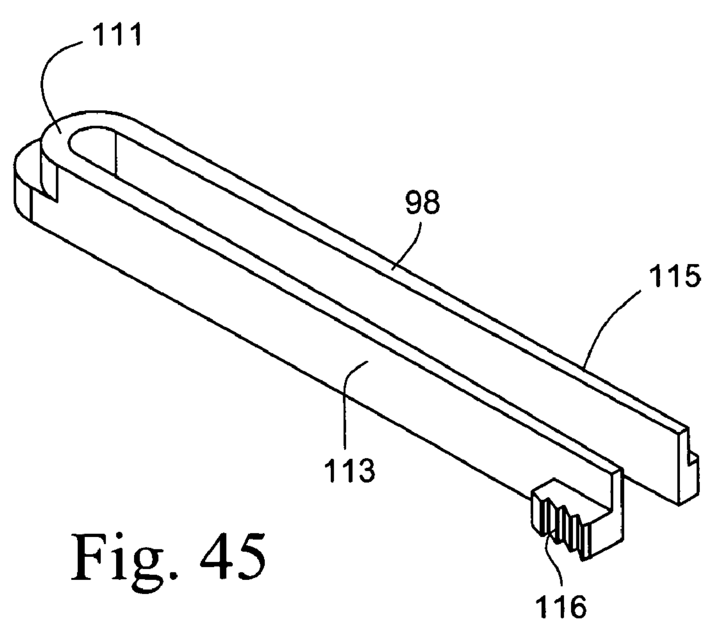
FIG. 45 is an isometric view of an elbow restraint bolt keeper.

A rectangular section 100 of the inboard elbow restraint 94 is designed to translate or slide in a rectangular cavity 102 in the outboard elbow restraint 92. The elbow restraint bolt 96 shown in FIG. 44 passes through a counter bored hole 106 in the outboard elbow restraint 92 and threads into a threaded hole 108 in the inboard elbow restraint 94. The action of rotating the elbow restraint bolt 96, the head 110 of which bears in the counter bored opening 112 of the outboard elbow restraint 92 draws the clamping elements (i.e., outboard and inboard elbow restraints 92 and 94) together and thus applies a clamping force on the short radius elbow 17. Teeth 112 are machined into the periphery of the head 110 of the elbow restraint bolt 96. These teeth 112 interface with mating teeth 116 of the elbow restraint bolt keeper 98, which is shown in FIG. 45. This keeper 98 is held captive in a machined depression 120 (FIG. 40) in the outboard elbow restraint 92. As can be seen from FIG. 45, the elbow restraint bolt keeper 118 has a shape similar to that of stop bolt keeper 38, that is, it is shaped like a hairpin with two cantilever beams 113 and 115 joined at one end 111. The teeth 116 are located at a free end of cantilever beam 113, again, as shown in FIG. 45.

Figure 48A:
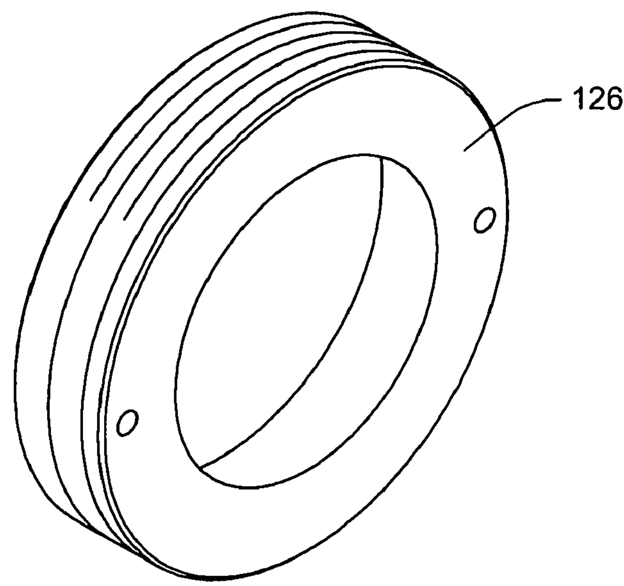
FIGS. 48(*a*) and (*b*) are isometric views of a swivel mount cover.
Figure 48B:
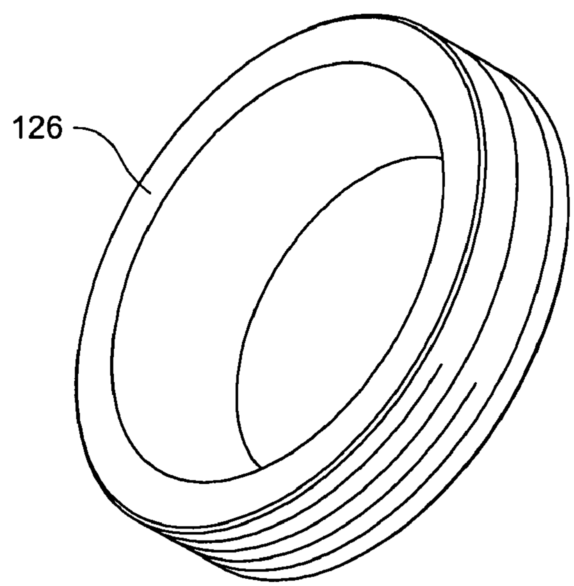
Figure 49:
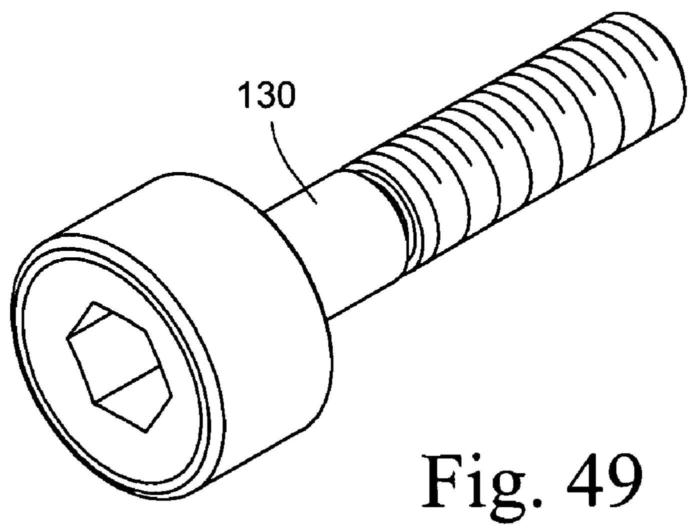
FIG. 49 is an isometric view of a swivel mount bolt.
Figure 50:
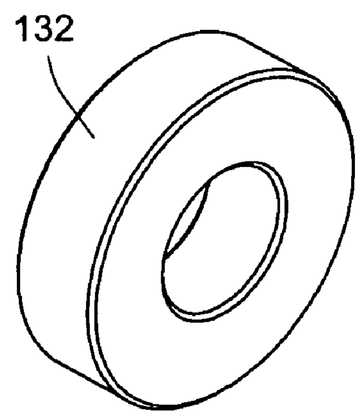
FIG. 50 is an isometric view of a swivel mount spacer.

Once the horizontal piping clamp subassembly 22 and downcomer clamp subassembly 26 are installed on the core spray line 10 and downcomer line 18, respectively, and joined together at the connector bolt 78, the connector bolt 78 orientation is defined by the as-built geometry of the core spray line 10 and downcomer line 18. In order to accommodate the orientation of the connector bolt 78, a swivel mount 122, ball swivel 124, and a swivel mount cover 126 are assembled together to form a "ball and socket" swivel mount subassembly 128. These components are shown in FIGS. 46-48. The swivel mount subassembly 128 is threaded onto the connector bolt 78 as shown in FIGS. 37-39. This swivel mount subassembly 128 is joined to the inboard elbow restraint 94 by virtue of swivel mount bolts 130 and swivel mount spacers 132. The swivel mount spacers 132 are "field" machined to correspond to the perpendicular distance between the inboard elbow restraint 94 and the swivel mount 122. The swivel mount bolts 130 and swivel mount spacer 132 are shown in FIGS. 49 and 50, respectively. In order to provide adjustability to the design, slots 134 are provided in the inboard elbow restraint 94 for passage of the swivel mount bolts 130. Also, the position of the swivel mount subassembly 128 on the connector bolt 78 can be adjusted by adjusting the position of the ball swivel 124 on the connector bolt 78.

The final phase of installing the elbow clamp assembly 24 involves the electric discharge machining "EDM" of conical holes in the core spray line 10 and the downcomer line 18 and the installation of two stop bolts 36. The upper clamp body 28 of horizontal piping clamp subassembly 22 and outboard clamp body 74 of downcomer clamp subassembly 26 are used to fixture an electric discharge machining actuator (not shown), which machines conical holes 136 into the horizontal core spray pipe and downcomer piping to a specified depth. The stop bolts 36, shown in FIG. 15, are then threaded into the upper clamp and outboard clamp bodies 28 and 74. The distal end 139 of the stop bolt is conical in shape and thus designed to seat into the conical EDM hole 136 in the core spray line 10 and the downcomer pipe 18.

Figure 8:
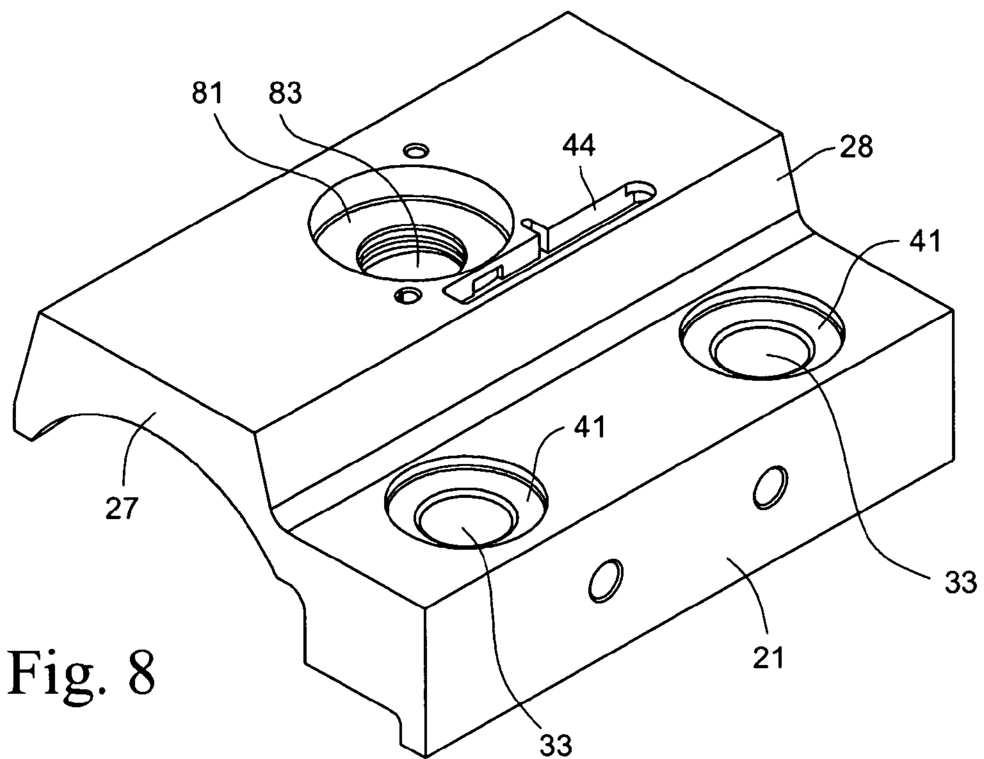
FIG. 8 is a top isometric view of an upper clamp body.
Figure 26:
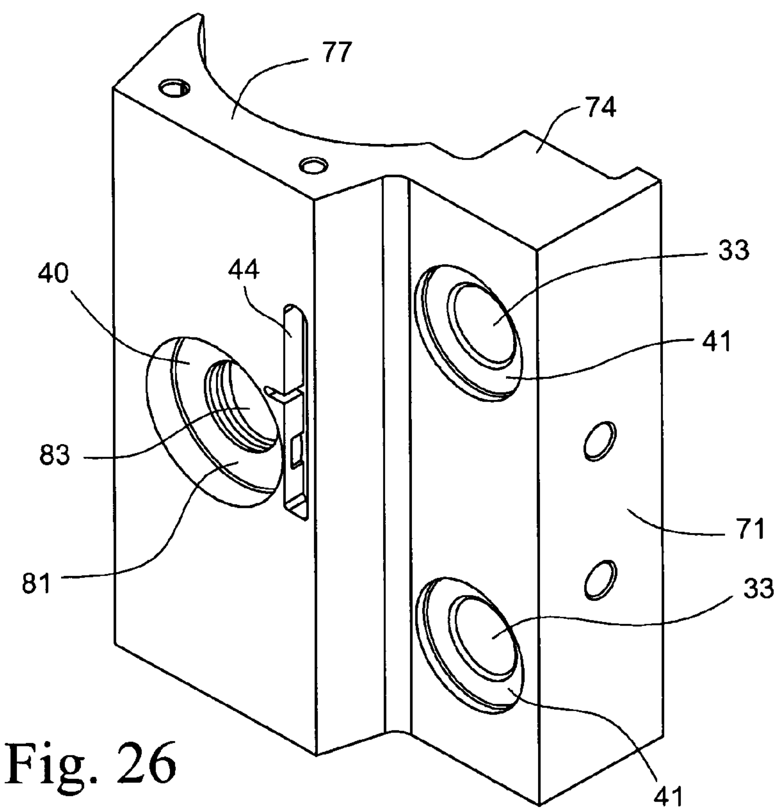
FIG. 26 is an isometric view of an outboard clamp body.
Figure 28:
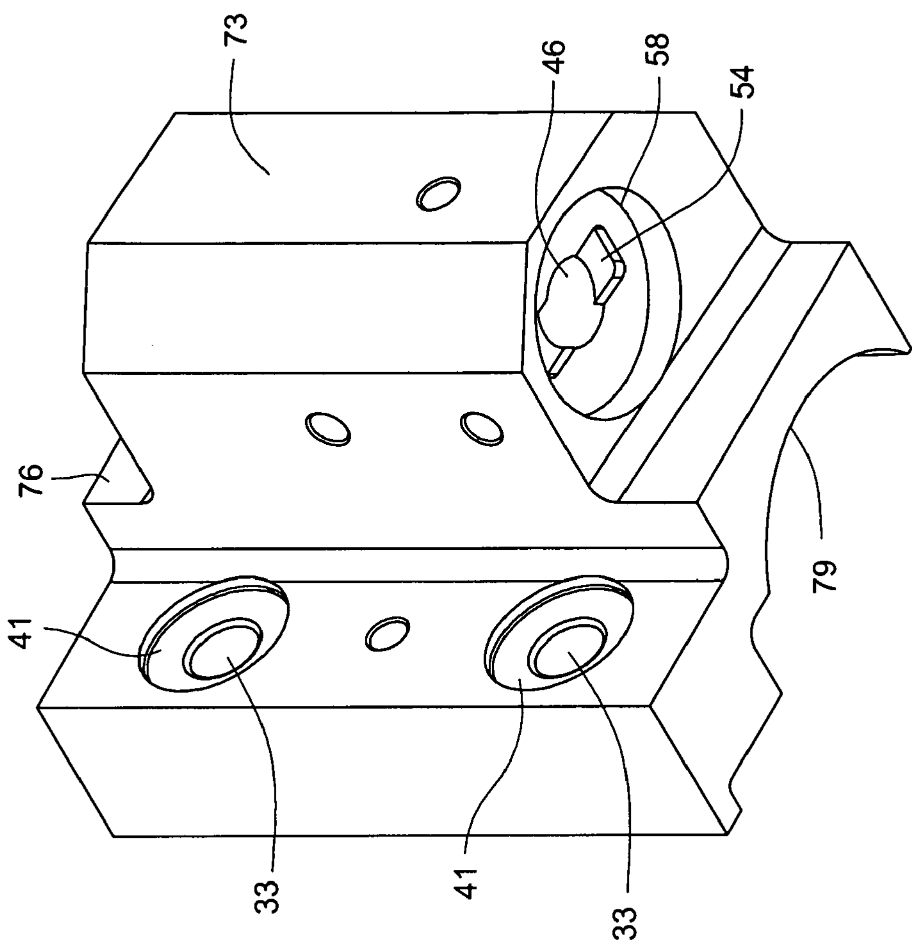
FIG. 28 is an isometric view of an inboard clamp body.
Figure 27:
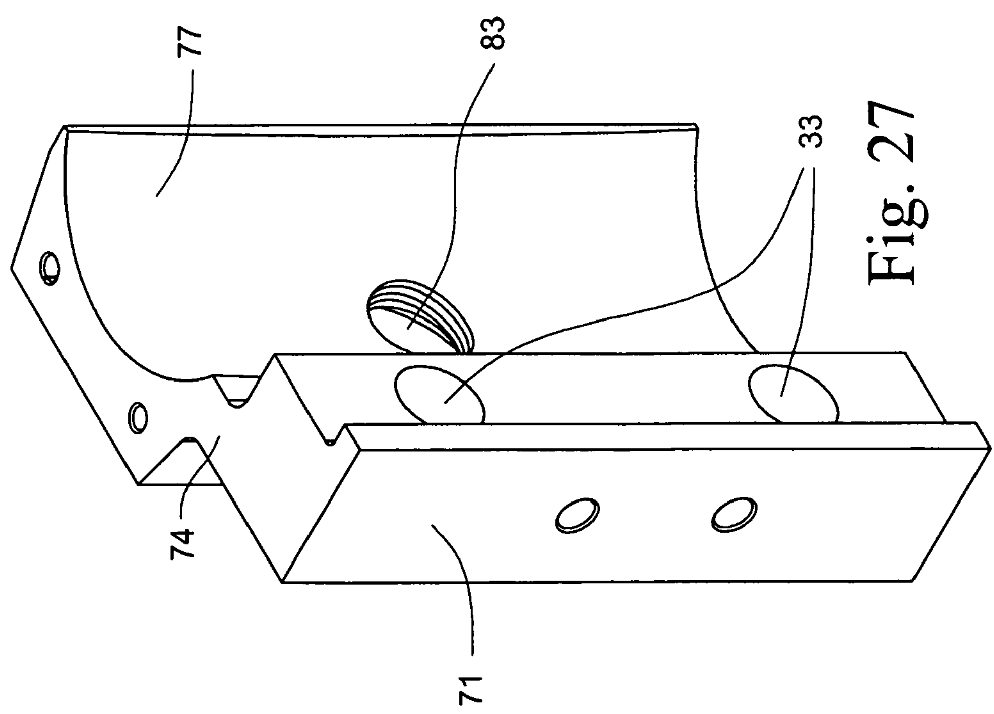
FIG. 27 is another isometric view of the outboard clamp body of FIG. 26.
Figure 29:
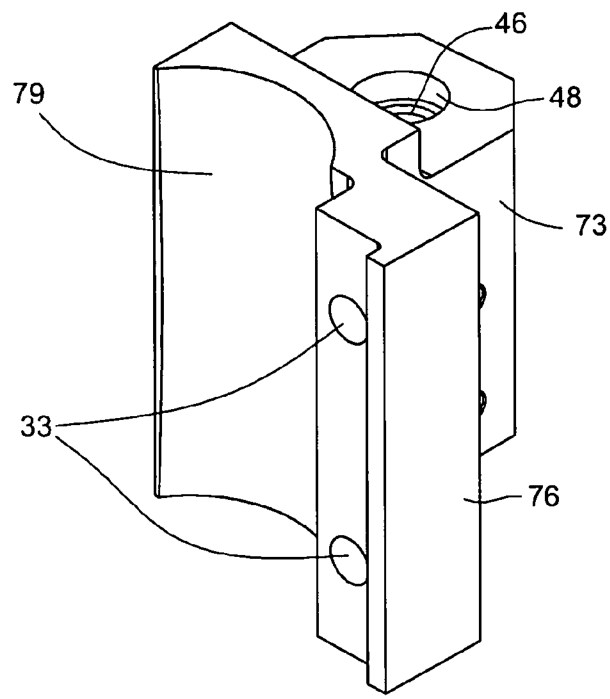
FIG. 29 is another isometric view of the inboard clamp body of FIG. 28.

As shown in FIGS. 8 and 26, seating surfaces 81 surrounding stop bolt penetration holes 83 oppose, but do not contact, surfaces 47 on stop bolts 36 when such bolts are threaded into stop bolt penetration holes 83 in clamp housings 28 and 74. Surfaces 47 do not contact seating surfaces 81 because, as stop bolts 36 are fully threaded into clamp housings 28 and 74, the conically shaped distal ends 139 of the stop bolts 36 seat into conical holes 136 machined in the core spray line piping and the downcomer pipe 18. This design feature ensures that coolant leakage is minimized.

Figure 16:
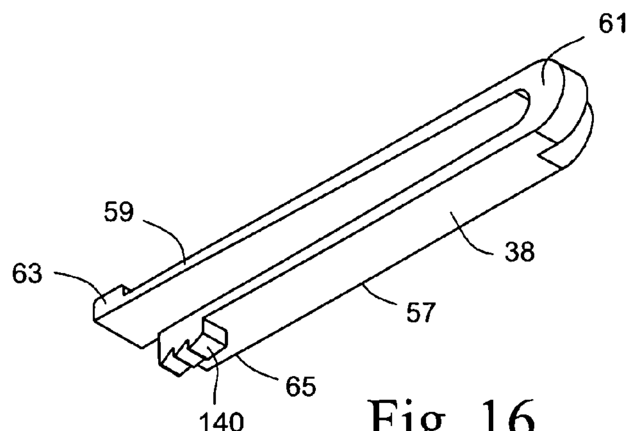
FIG. 16 is an isometric view of a stop bolt keeper.
Figure 17:
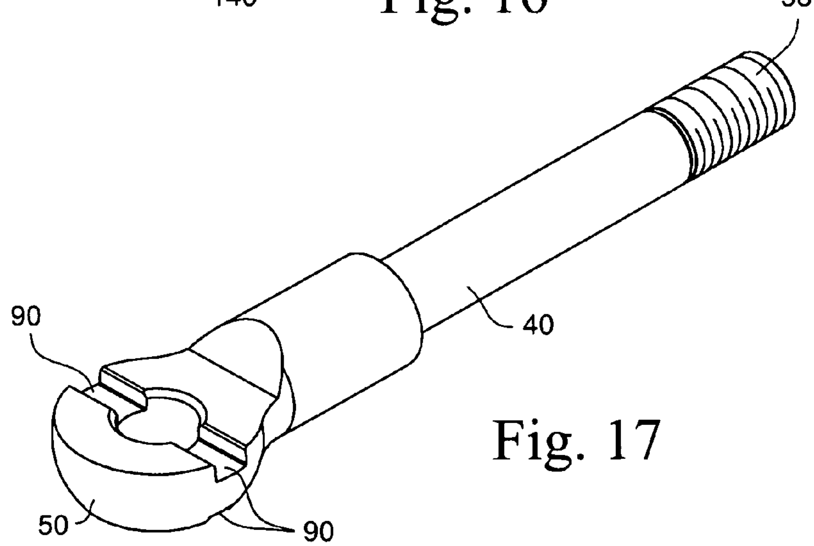
FIG. 17 is an isometric view of a strut.
Figures 18, 19, 20:
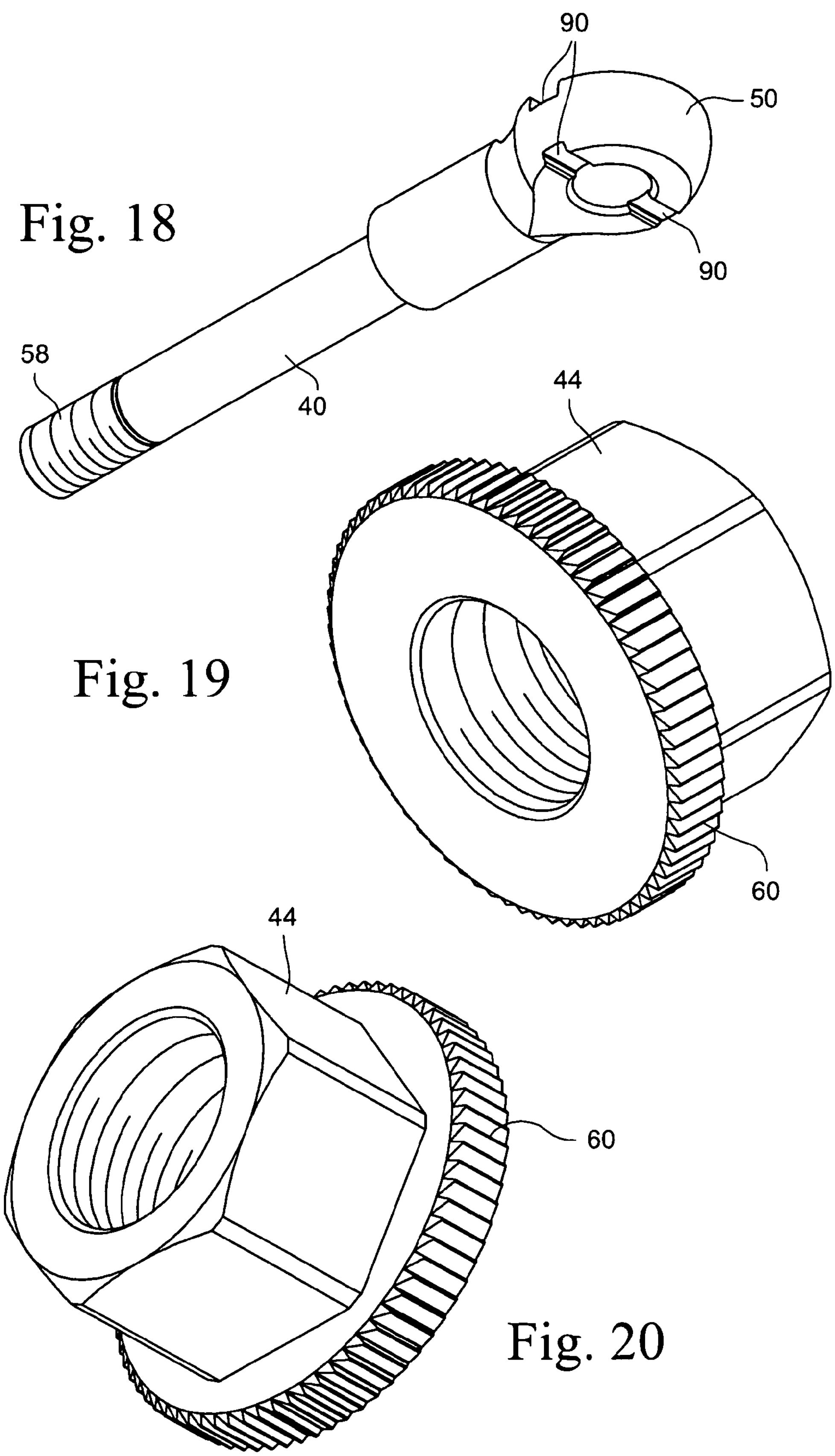
FIG. 18 is another isometric view of the strut of FIG. 17.
FIG. 19 is an isometric view of a strut nut/connector bolt nut.
FIG. 20 is another isometric view of the strut nut/connector bolt nut of FIG. 19.
Figure 21:
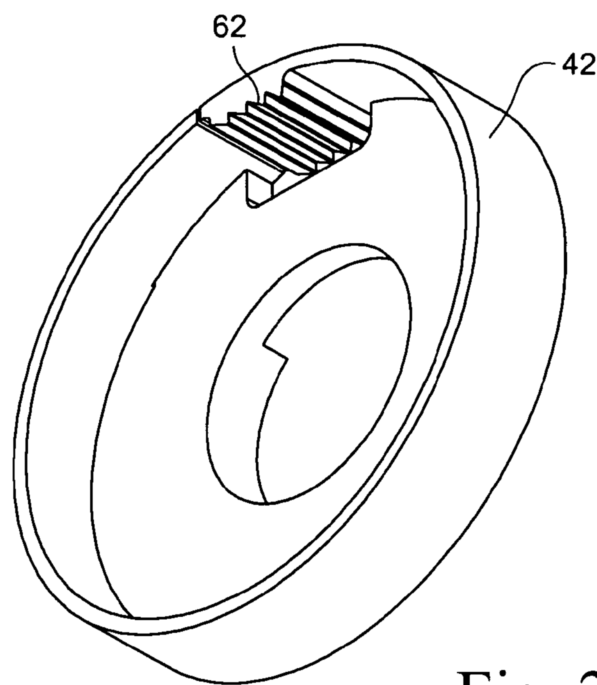
FIG. 21 is an isometric view of a strut nut keeper.
Figure 22:
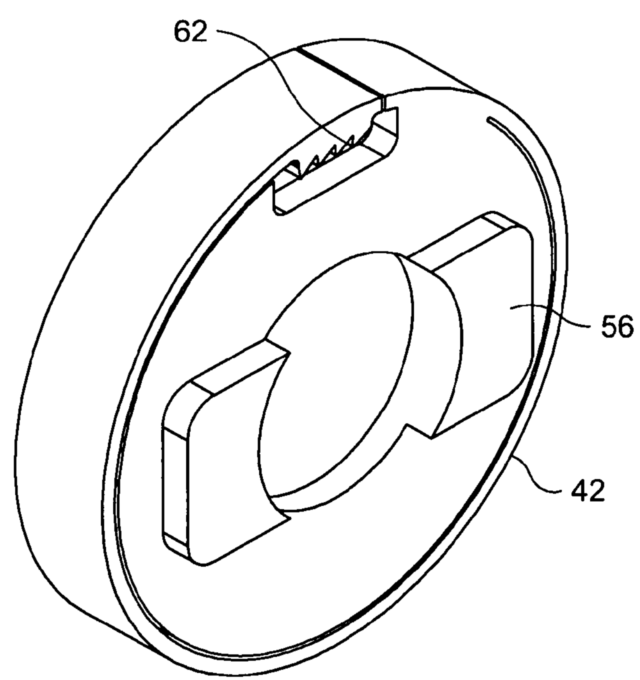
FIG. 22 is another isometric view of the strut nut keeper of FIG. 21.

Ratchet teeth 138 are integrated into the design of the stop bolt 36, which interface with corresponding teeth 140 on the stop bolt keeper 38. The stop bolt keeper 38 shown in FIG. 16 is designed to permit only clockwise rotation of the stop bolt 36, and thus prevent loss of preload when subjected to flow induced vibration. The stop bolts 36 are incorporated into the design of the elbow clamp assembly in order to provide a positive means of preventing pipe separation and the resultant uncontrolled leakage in the event of failure of the P4a weld or P4b weld.

As can be seen from FIG. 16, the stop bolt keeper 38 is preferably shaped like a hairpin, which consists of essentially two cantilever beams 57 and 59 joined at one end 61. There are retaining features at the free ends 63 and 65 of the first and second cantilever beams 57 and 59, and also at the common end 61 where both beams are joined together. In addition, the retaining feature at the end 61 of the first cantilever beam 57 also incorporates teeth 140, which interface with the teeth 138 of the stop bolt 36 and function to prevent rotation of the stop bolt 36 in the direction that decreases bolt preload.

Subsequent to installation of the stop bolts 36 and final application of torque to all of the clamp bolt keeper nuts 34, the crimp collars 68 of the keeper nuts 34 are crimped over the fluted ends 66 of the respective bolts 32.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An apparatus for repairing welded joints connecting an elbow between first and second pipes, the apparatus comprising:

a first clamp subassembly for attachment to the first pipe, a second clamp subassembly for attachment to the second pipe, and an elbow restraint subassembly for attachment to the elbow, the first clamp subassembly having a first strut fixedly inserted through a part of the first clamp subassembly, the second clamp subassembly having a second strut fixedly inserted through a part of the second clamp subassembly, the elbow restraint subassembly including a plurality of components for attaching the first strut and the second strut to one another and to the elbow restraint subassembly so that the elbow restraint subassembly and the first and second clamp subassemblies are fixedly positioned with respect to one another, and thereby the first and second pipes prevented from separating from the elbow.

2. The apparatus of claim 1, wherein the elbow restraint subassembly comprises:

an inboard elbow restraint body including a protrusion curved to conform to an inside radius of the elbow, an outboard elbow restraint body including a plurality of fingers shaped to conform to an outside radius of the elbow, the outboard elbow restraint body including a cavity for slidably receiving a complimentary-shaped section of the inboard elbow restraint body, and at least one restraint bolt threaded into the complimentary-shaped section of the inboard elbow restraint body to draw together the outboard and inboard elbow restraint bodies to thereby secure the plurality of fingers and the curved protrusion on opposite sides of the elbow in facing relation to one another.

3. The apparatus of claim 2, wherein the plurality of components for attaching the first strut and the second strut to one another and to the elbow restraint assembly are comprised of:

a swivel mount subassembly for adjusting the orientation of the plurality of components to facilitate connecting the first and second struts to one another and to the elbow restraint subassembly, the swivel mount subassembly being mounted on the inboard elbow restraint body, and a connector bolt inserted through the first and second struts and attached to the swivel mount subassembly.

4. The apparatus of claim 3, wherein the swivel mount subassembly is comprised of:

a swivel mount adjustably attached to the inboard elbow restraint body, a ball swivel rotatably mounted in the swivel mount, the connector bolt being threaded into the ball swivel, and a swivel mount cover threaded into the swivel mount so as to hold the ball swivel within the swivel mount.

5. The apparatus of claim 3 further comprising:

a connector bolt nut threaded over the connector bolt and having a first plurality of teeth extending around a circumference of the connector bolt nut, a connector bolt nut keeper positioned adjacent to the connector bolt nut and having a second plurality of teeth engaging the first plurality of teeth to prevent the connector bolt nut from rotating, and a strut spacer positioned between the first and second struts, the connector bolt, the strut spacer and the connector bolt nut keeper having a plurality of keys positioned to engage corresponding keyways located on the first and second struts so as to prevent the first and second struts from moving relative to the connector bolt, whereby the elbow restraint subassembly and the first and second clamp subassemblies are all fixedly oriented with respect to one another.

6. The apparatus of claim 1, wherein the first and second clamp subassemblies are each comprised of:

a first clamp body including a first curved jaw, a second clamp body including a second curved jaw, the second clamp body including a through hole through which the first or second strut is inserted, and at least one clamp bolt and at least one clamp bolt keeper nut joined together to connect the first and second clamp bodies together and thereby secure the first and second curved jaws on opposite sides of the first or second pipe in facing relation, the at least one clamp bolt extending through portions of the connected first and second clamp bodies other than the first and second curved jaws.

7. The apparatus of claim 6, further comprising:

at least one stop bolt inserted into the first curved jaw of the first clamp body, the at least one stop bolt being seated in a hole machined in the first or second pipe, and at least one stop bolt keeper corresponding to the at least one stop bolt, the at least one stop bolt keeper being located on the first curved jaw of the first clamp body, a first portion of the at least one stop bolt engaging a second portion of the at least one stop bolt keeper so as to prevent rotation of the at least one stop bolt and thereby retain a preload on the at least one stop bolt.

8. The apparatus of claim 6, further comprising:

a strut nut threaded onto an end of the first or second strut, and having a first plurality of teeth, a strut nut keeper positioned within a counter bore within the second clamp body, and having a second plurality of teeth engaging the first plurality of teeth to prevent the strut nut from rotating, the counter bore including a keyway for interfacing with a key on the strut nut keeper to prevent the strut nut keeper from rotating.

9. The apparatus of claim 6, wherein the first and second curved jaws have a predetermined radius of curvature for engaging the first or second pipe that is slightly smaller than a nominal radius of curvature of the first or second pipe to which the first or second curved jaws are applied.

10. The apparatus of claim 9, wherein the predetermined radius of curvature of the first or second curved jaws relative to the nominal radius of curvature of the first or second pipe causes each of the first or second curved jaws to contact the first or second pipe at a plurality of contact points so as to form a plurality of gaps between the first or second pipe and the first or second curved jaws to thereby ensure that the clamping device engages the first or second pipe in a stable manner.

11. The apparatus of claim 6, wherein the at least one clamp bolt keeper nut is threaded over the at least one clamp bolt so as to cause the first and second curved jaws to be clamped in position on the first or second pipe by virtue of a mechanical tensile force imposed by the at least one clamp bolt being held in position through the first and second clamp bodies by the at least one clamp bolt keeper nut.

12. The apparatus of claim 6, wherein a distal end of the at least one clamp bolt is machined to an outside diameter slightly smaller than an inside diameter of a crimp collar of the at least one clamp bolt keeper nut and is machined with a plurality of flutes to facilitate crimping of the at least one clamp bolt keeper nut crimp collar onto the distal end of the at least one clamp bolt.

13. The apparatus of claim 12, wherein the at least one clamp bolt keeper nut crimp collar has a wall thickness that facilitates crimping of the at least one clamp bolt keeper nut crimp collar onto the distal end of the at least one clamp bolt.

14. The apparatus of claim 12, wherein the at least one clamp bolt keeper nut includes an extension collar with internal threads, the threaded extension collar facilitating remote installation of the clamp subassembly over the first or second pipe by allowing the first and second clamp bodies to be separated sufficiently to pass over the outside diameter of the first or second pipe and then clamped together by the at least one clamp bolt keeper nut being threaded onto the at least one clamp bolt.

15. The apparatus of claim 7, wherein the at least one stop bolt keeper is shaped like a hairpin consisting of two beams joined at one end, and a first plurality of teeth at the distal end of one of the two beams engages a second plurality of teeth on the at least one stop bolt to limit rotation of the at least one stop bolt in a direction that decreases the preload on the at least one stop bolt.

16. The apparatus of claim 6, wherein the first and second clamp bodies further comprise first and second blocks that receive the at least one clamp bolt, and wherein the first and second blocks include spherical seating surfaces that mate with at least one complimentary-shaped spherical head of the at least one clamp bolt and with at least one complimentary-shaped spherical nut that is part of the at least one clamp bolt keeper nut.

17. The apparatus of claim 7, wherein the first curved jaw of the first clamp body includes at least one hole through which the at least one stop bolt is inserted, the first curved jaw including a seating surface that opposes, but is not contacted by, a lower surface of the mid portion of the at least one stop bolt when the at least one stop bolt is fully inserted into the first curved jaw, the stop bolt having a conically shaped distal end that seats into a corresponding conically shaped hole machined in the first or second pipe so as to preclude the seating surface and the lower surface from contacting one another.

18. The apparatus of claim 2, further comprising:

at least one restraint bolt keeper corresponding to the at least one restraint bolt, the at least one restraint bolt keeper being located on the outboard elbow restraint adjacent to the at least one restraint bolt, the at least one restraint bolt having a first plurality of teeth engaging a second plurality of teeth on the at least one restraint bolt keeper so as to prevent rotation of the at least one restraint bolt.

19. The apparatus of claim 1 wherein the first pipe is a reactor vessel core spray line pipe and the second pipe is a downcomer pipe, the first clamp subassembly is a spray line pipe clamp subassembly for attachment to the spray line pipe, the spray line pipe clamp subassembly having a first strut inserted through a part of the spray line pipe clamp subassembly, the second clamp subassembly is a downcomer pipe clamp subassembly for attachment to the downcomer pipe, the downcomer pipe clamp subassembly having a second strut inserted through a part of the downcomer clamp subassembly, and the elbow restraint subassembly includes a plurality of components for attaching the first strut and the second strut to one another and to the elbow restraint subassembly so that the elbow restraint subassembly, the spray line pipe clamp subassembly and the downcomer pipe clamp subassembly are fixedly positioned with respect to one another, and thereby the spray line pipe and the downcomer pipe prevented from separating from the elbow.

20. The apparatus of claim 19, wherein the elbow restraint subassembly comprises:

an inboard elbow restraint body including a protrusion curved to conform to an inside radius of the elbow, an outboard elbow restraint body including a plurality of fingers shaped to conform to an outside radius of the elbow, the outboard elbow restraint body including a cavity for slidably receiving a complimentary-shaped section of the inboard elbow restraint body, and at least one restraint bolt threaded into the complimentary-shaped section of the inboard elbow restraint body to draw together the outboard and inboard elbow restraint bodies to thereby secure the plurality of fingers and the curved protrusion on opposite sides of the elbow in facing relation to one another.

21. The apparatus of claim 19, wherein the plurality of components for attaching the first strut and the second strut to one another and to the elbow restraint assembly are comprised of:

a swivel mount subassembly mounted on the inboard elbow restraint body, and a connector bolt inserted through the first and second struts and attached to the swivel mount subassembly.

22. The apparatus of claim 19, wherein the spray line pipe clamp subassembly is comprised of:

an upper clamp body including an upper curved jaw, a lower clamp body including a lower curved jaw, the lower clamp body including a through hole through which the first or second strut is inserted, at least one clamp bolt and at least one clamp bolt keeper nut joined together to connect the upper and lower clamp bodies together and thereby secure the upper and lower curved jaws on opposite sides of the spray line pipe in facing relation, the at least one clamp bolt extending through portions of the connected upper and lower clamp bodies other than the upper and lower curved jaws, at least one stop bolt inserted into the upper curved jaw of the upper clamp body, a conical end of the at least one stop bolt being seated in a conical hole machined in the spray line pipe, and at least one stop bolt keeper corresponding to the at least one stop bolt, the at least one stop bolt keeper being located on the upper curved jaw of the upper clamp body, a portion of the at least one stop bolt engaging a complementary portion of the at least one stop bolt keeper so as to prevent rotation of the at least one stop bolt and thereby retain a preload on the at least one stop bolt.

23. The apparatus of claim 19, wherein the downcomer pipe clamp subassembly is comprised of:

an outboard clamp body including an outboard curved jaw, an inboard clamp body including an inboard curved jaw, the inboard clamp body including a through hole through which the first or second strut is inserted, at least one clamp bolt and at least one clamp bolt keeper nut joined together to connect the upper and lower clamp bodies together and thereby secure the outboard and inboard curved jaws on opposite sides of the downcomer pipe in facing relation, the at least one clamp bolt extending through portions of the connected outboard and inboard clamp bodies other than the outboard and inboard curved jaws, at least one stop bolt inserted into the outboard curved jaw of the outboard clamp body, the at least one stop bolt being seated in a hole machined in the downcomer pipe, and at least one stop bolt keeper corresponding to the at least one stop bolt, the at least one stop bolt keeper being located on the outboard curved jaw of the outboard clamp body, a portion of the at least one stop bolt engaging a complementary portion of the at least one stop bolt keeper so as to prevent rotation of the at least one stop bolt and thereby retain a preload on the at least one stop bolt.

24. An apparatus for repairing welded joints connecting an elbow between first and second pipes, the apparatus comprising:

a first and second clamp subassemblies for attachment to the first and second pipe, respectively, the first and second clamp subassemblies each being comprised of:

a first and second clamp bodies, at least one clamp bolt extending through the first and second clamp bodies, at least one clamp bolt keeper nut threaded onto the at least one clamp bolt to join together the first and second clamp bodies on opposite sides of the first or second pipe in facing relation, at least one stop bolt inserted into the first clamp body and seated in a hole machined in the first or second pipe, and at least one stop bolt keeper located on the first clamp body and engaging the at least one stop bolt to prevent rotation of the at least one stop bolt and thereby retain a preload on the at least one stop bolt, and an elbow restraint subassembly for attachment to the elbow, the elbow restraint subassembly comprising:

an inboard elbow restraint body including a protrusion curved to engage an inside radius of the elbow, an outboard elbow restraint body including a plurality of fingers shaped to engage an outside radius of the elbow, at least one restraint bolt extending through the outboard elbow restraint body and being threaded into the inboard elbow restraint body to draw together the outboard and inboard elbow restraint bodies and thereby secure the plurality of fingers and the curved protrusion on opposite sides of the elbow in facing relation to one another, and at least one restraint bolt keeper located on the outboard elbow restraint and engaging the at least one restraint bolt to prevent rotation of the at least one restraint bolt, the first and second clamp subassemblies having first and second struts inserted through parts of first and second clamp subassemblies, respectively, the elbow restraint subassembly further comprising a swivel mount subassembly and a connector bolt inserted through the first and second struts and attached to the swivel mount subassembly for attaching the first strut and the second strut to one another and to the elbow restraint subassembly so that the elbow restraint subassembly and the first and second clamp subassemblies are fixedly positioned with respect to one another, and thereby the first and second pipes prevented from separating from the elbow.

* * * * *